US011579001B2

(12) United States Patent
Watanabe et al.

(10) Patent No.: US 11,579,001 B2
(45) Date of Patent: Feb. 14, 2023

(54) CALIBRATOR, ENCODER, DRIVING DEVICE, STAGE DEVICE, ROBOT, ENCODER MANUFACTURING METHOD, AND CALIBRATION PROGRAM

(71) Applicant: NIKON CORPORATION, Tokyo (JP)

(72) Inventors: Akihiro Watanabe, Tokyo (JP); Masahisa Takasaki, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 470 days.

(21) Appl. No.: 16/634,065

(22) PCT Filed: Jul. 12, 2018

(86) PCT No.: PCT/JP2018/026343
§ 371 (c)(1),
(2) Date: Jan. 24, 2020

(87) PCT Pub. No.: WO2019/021845
PCT Pub. Date: Jan. 31, 2019

(65) Prior Publication Data
US 2020/0370927 A1   Nov. 26, 2020

(30) Foreign Application Priority Data
Jul. 27, 2017   (JP) .............................. JP2017-145399

(51) Int. Cl.
*G01D 5/244* (2006.01)
*G01D 5/347* (2006.01)
*G01D 18/00* (2006.01)

(52) U.S. Cl.
CPC ....... *G01D 18/001* (2021.05); *G01D 5/24438* (2013.01); *G01D 5/347* (2013.01)

(58) Field of Classification Search
CPC ............. G01D 18/001; G01D 5/24438; G01D 5/2449; G01D 5/24485
See application file for complete search history.

(56) References Cited

U.S. PATENT DOCUMENTS 9,341,500 B2 * 5/2016 Lippuner ............. G01D 18/001
2011/0147572 A1 * 6/2011 Nakamura ........... G01D 5/2448
250/231.16

(Continued)

FOREIGN PATENT DOCUMENTS

| JP | H07-140856 A | 6/1995 |
| JP | H08-050034 A | 2/1996 |

(Continued)

OTHER PUBLICATIONS

Aug. 7, 2018 International Search Report issued in International Patent Application No. PCT/JP2018/026343.

(Continued)

*Primary Examiner* — Christopher P Mcandrew
*Assistant Examiner* — Zannatul Ferdous
(74) *Attorney, Agent, or Firm* — Oliff PLC

(57) ABSTRACT

A calibrator includes: a position calculator which calculates a relative position between a first detector and a second detector on the basis of detection signals acquired respectively from the first detector, the second detector, and a third detector positioned with respect to a scale attached to a rotating body; and an error calculator which calculates error information on rotational position information of the rotating body on the basis of the relative position calculated by the position calculator as well as the detection signals.

33 Claims, 18 Drawing Sheets

(56) References Cited

U.S. PATENT DOCUMENTS

| | | | |
|---|---|---|---|
| 2011/0202308 A1 | 8/2011 | Kishida et al. | |
| 2018/0245952 A1* | 8/2018 | Takahashi | B25J 18/00 |
| 2019/0329819 A1* | 10/2019 | Shan | B62D 5/20 |
| 2020/0173774 A1* | 6/2020 | Kudo | G01D 5/2452 |

FOREIGN PATENT DOCUMENTS

| | | |
|---|---|---|
| JP | 2012-163436 A | 8/2012 |
| JP | 2016-118491 A | 6/2016 |
| WO | 2010/023896 A1 | 3/2010 |
| WO | 2011/074103 A1 | 6/2011 |

OTHER PUBLICATIONS

Jan. 28, 2020 International Preliminary Report on Patentability issued in International Patent Application No. PCT/JP2018/026343.
Feb. 28, 2022 Office Action issued in Chinese Patent Application No. 201880048937.2.
May 10, 2022 Office Action issued in Japanese Patent Application No. 2019-532506.
Jun. 18, 2021 Office Action issued in Chinese Patent Application No. 201880048937.2.

* cited by examiner

CALIBRATOR, ENCODER, DRIVING DEVICE, STAGE DEVICE, ROBOT, ENCODER MANUFACTURING METHOD, AND CALIBRATION PROGRAM

TECHNICAL FIELD

The present invention relates to a calibrator, an encoder, a driving device, a stage device, a robot, an encoder manufacturing method, and a calibration program.

BACKGROUND ART

A rotary encoder which detects rotational position information is mounted on various devices such as a driving device (for example, a motor device) (for example, see Patent Literature 1 below). Techniques for finding a calibration value of an error in an angle detection device such as a rotary encoder have been proposed.

CITATION LIST

Patent Literature

[Patent Literature 1] Japanese Unexamined Patent Application, First Publication No. H8-50034

SUMMARY OF INVENTION

According to a first aspect of the present invention, a calibrator is provided, the calibrator comprising: a position calculator which calculates a relative position between a first detector and a second detector on the basis of detection signals acquired respectively from the first detector, the second detector, and a third detector positioned with respect to a scale attached to a rotating body; and an error calculator which calculates error information on rotational position information of the rotating body on the basis of the relative position calculated by the position calculator as well as the detection signals.

According to a second aspect of the present invention, an encoder is provided, the encoder comprising: a memory storage which stores error information output from the calibrator of the first aspect; a scale attached to a second rotating body; a detector positioned with respect to the scale; and a corrector which corrects rotational position information of the second rotating body acquired from a detection result, on the basis of the error information stored in the memory storage.

According to a third aspect of the present invention, an encoder is provided, the encoder comprising: a first detector, a second detector, and a third detector positioned with respect to the scale attached to the second rotating body; a position calculator which calculates a relative position between the first detector and the second detector on the basis of detection signals acquired respectively from the first detector, the second detector, and the third detector; and an error calculator which calculates error information on rotational position information of the second rotating body on the basis of the relative position calculated by the position calculator as well as the detection signals.

According to a fourth aspect of the present invention, an encoder is provided, the encoder comprising: a scale attached to a rotation shaft; a first detector which detects the scale and outputs a first detection signal; a memory storage which stores error information calculated using a relative position between a first detector and at least one of two detectors, the two detectors being different from the first detector, calculated on the basis of the first detection signal as well as a second detection signal and a third detection signal which are output by the two detectors upon detecting the scale; and a corrector which corrects rotational position information of the rotation shaft acquired from the first detection signal, using the error information.

According to a fifth aspect of the present invention, an encoder which calculates rotational position information of a rotation shaft is provided, the encoder comprising: a scale attached to a rotation shaft; a calibration target detector fixed on a substrate which detects the scale and outputs a first detection signal; a processor which calculates the rotational position information on the basis of the first detection signal; and a corrector which corrects the rotational position information, using error information stored in a memory storage, wherein, with two calibration detectors being attached to the substrate when calculating the error information, the error information is calculated on the basis of a relative position between the calibration target detector and at least one of the calibration detectors, the relative position being calculated using the first detection signal as well as a second detection signal and a third detection signal output by the two calibration target detectors upon detecting the scale.

According to a sixth aspect of the present invention, a driver device is provided, the driver device comprising: the encoder according to the second aspect or the third aspect; and a driver which supplies a driving force to a second rotating body.

According to a seventh aspect of the present invention, a driver device is provided, the driver device comprising: the encoder according to the fourth aspect or the fifth aspect; and a driver which supplies a driving force to the rotation shaft.

According to an eighth aspect of the present invention, a stage device is provided, the stage device comprising: the driving device according to the sixth aspect or the seventh aspect; and a stage which is moved by the driving device.

According to a ninth aspect of the present invention, a robot is provided, the robot comprising: the driving device according to the sixth aspect or the seventh aspect; and an arm which is moved by the driving device.

According to a tenth aspect of the present invention, an encoder manufacturing method is provided, the encoder manufacturing method comprising: calculating a relative position between a first detector and a second detector on the basis of detection signals acquired respectively from the first detector, the second detector, and a third detector positioned with respect to a scale attached to a rotating body; calculating error information on rotational position information of the rotating body on the basis of the calculated relative position as well as the detection signals; and storing the error information in a memory storage of an encoder.

According to an eleventh aspect of the present invention, a calibration program is provided, the calibration program causing a computer to execute processes comprising: calculating a relative position between a first detector and a second detector on the basis of detection signals acquired respectively from the first detector, the second detector, and a third detector positioned with respect to a scale attached to a rotating body; and calculating error information on rotational position information of the rotating body on the basis of the calculated relative position as well as the detection signals.

DESCRIPTION OF EMBODIMENTS

First Embodiment

Figure 1:
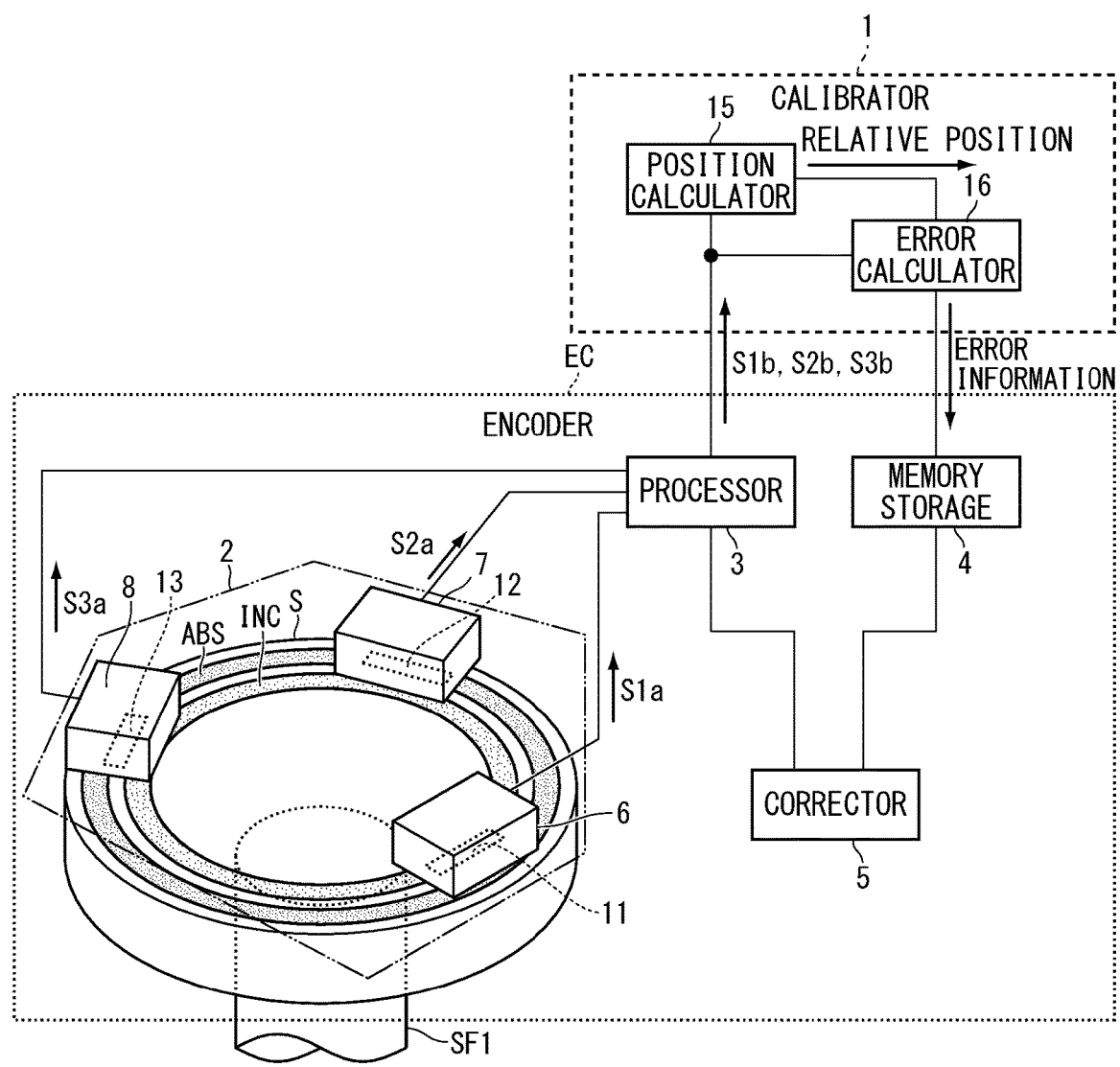
FIG. 1 is a diagram showing an encoder and a calibrator according to a first embodiment.
Figure 2:
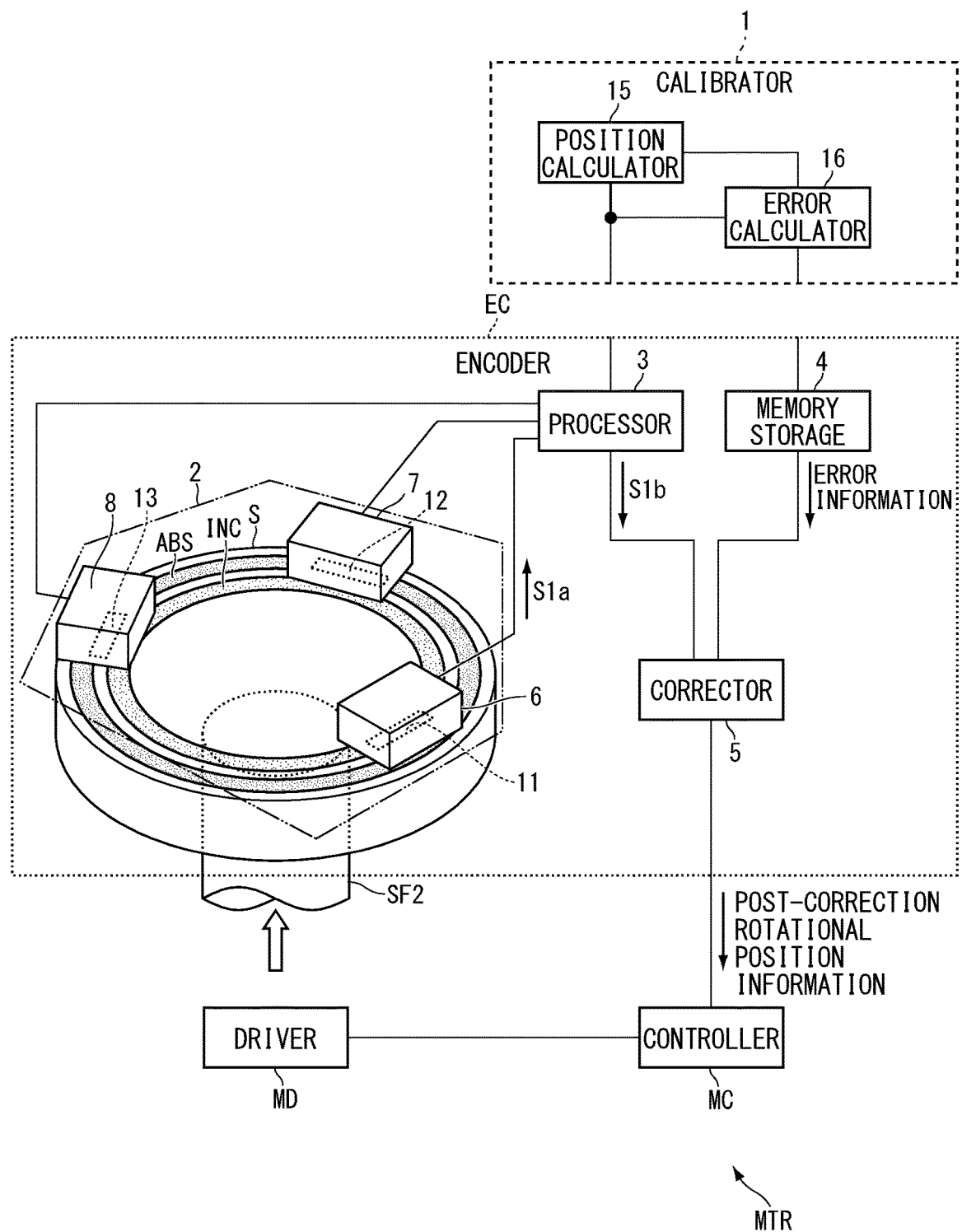
FIG. 2 is a diagram showing the encoder and the calibrator according to the first embodiment.

Hereunder, a first embodiment will be described. FIG. 1 and FIG. 2 are diagrams showing an encoder and a calibrator according to the first embodiment. An encoder EC detects rotational position information of a measurement-target rotating body. The rotational position information includes one or both of multi-rotation information and an angular position within one rotation. The multi-rotation information is a piece of information which indicates a number of rotations (for example, one rotation, two rotations). The angular position is a piece of information which indicates a rotation angle of less than one rotation (for example, 30 [deg], π [rad]).

A calibrator 1 executes a calibration process for the encoder EC. The calibrator 1 is used when manufacturing the encoder EC for example. The calibrator 1 calculates (generates) error information used for correcting detection results of the encoder EC in the calibration process. FIG. 1 shows an operation of the encoder EC and an operation of the calibrator 1 in the calibration process. FIG. 2 shows an operation of the encoder EC after the calibration process.

As shown in FIG. 1, when the calibrator 1 executes the calibration process, the encoder EC is attached to a rotating body SF1. In the calibration process, the encoder EC detects a scale S attached to the rotating body SF1. The calibrator 1 calculates error information on rotational position information of the rotating body SF1, on the basis of a detection signal acquired upon the encoder EC detecting the scale S. The calibrator 1 stores the calculated error information in the encoder EC of the calibration target. The encoder EC is removed from the calibrator 1 upon completion of the calibration process mentioned above.

As shown in FIG. 2, the encoder EC after the calibration process detects rotational position information of a rotating body SF2, for example. The rotating body SF2 may be the same as the rotating body SF1 used for the calibration process or may be a rotating body different from the rotating body SF1. The encoder EC may be removed from the rotating body SF1 (first rotating body) after the calibration process and may be attached to the detection target rotating body SF2 (the second rotating body), which is different from the rotating body SF1. The encoder EC after the calibration process corrects the detected rotational position information of the rotating body SF2, on the basis of the error information stored in the calibration process. The encoder EC then outputs the post-correction rotational position information to the outside. Hereinafter, each part of the encoder EC and each part of the calibrator 1 will be described.

As shown in FIG. 1, the encoder EC includes the scale S, a detection system 2, a processor 3, a memory storage 4, and a corrector 5. When the calibrator 1 executes the calibration process, the scale S is attached to the rotating body SF1 for calibration. The scale S is arranged so as to face at least a part of the detection system 2 and rotates together with the rotating body SF1.

The detection system 2 detects the scale S. The detection system 2 includes a first detector 11, a second detector 12, and a third detector 13. In the present embodiment, the encoder EC includes a first head 6, a second head 7, and a third head 8. Each of the first head 6, the second head 7, and the third head 8 includes, for example, an encoder head (a detection head). The first detector 11 is provided in the first head 6. The second detector 12 is provided in the second head 7. The third detector 13 is provided in the third head 8. The detection system 2 (the plurality of detection heads) is fixed on an encoder main body described later.

The first head 6, the second head 7, and the third head 8 are arranged so as to face the scale S. The scale S is rotated relative to each of the first head 6, the second head 7, and the third head 8 by the rotation of the rotating body SF1. Each of the first head 6, the second head 7, and the third head 8 detects a pattern of the scale S.

The first head 6 is, for example, a calibration target detection head (a head for detecting a calibration target (detector)). Each of the second head 7 and the third head 8 is a detection head for calibration. The detection head for calibration acquires information used for a calibration process for the first head 6. After the calibration process, the first head 6 is used for detecting rotational position information of a second rotating body (for example, the rotating body SF2 in FIG. 2). One or both of the second head 7 and the third head 8 may be used for detecting the rotational position of the second rotating body or may not be used for detecting the rotational position of the second rotating body.

Figure 3A:
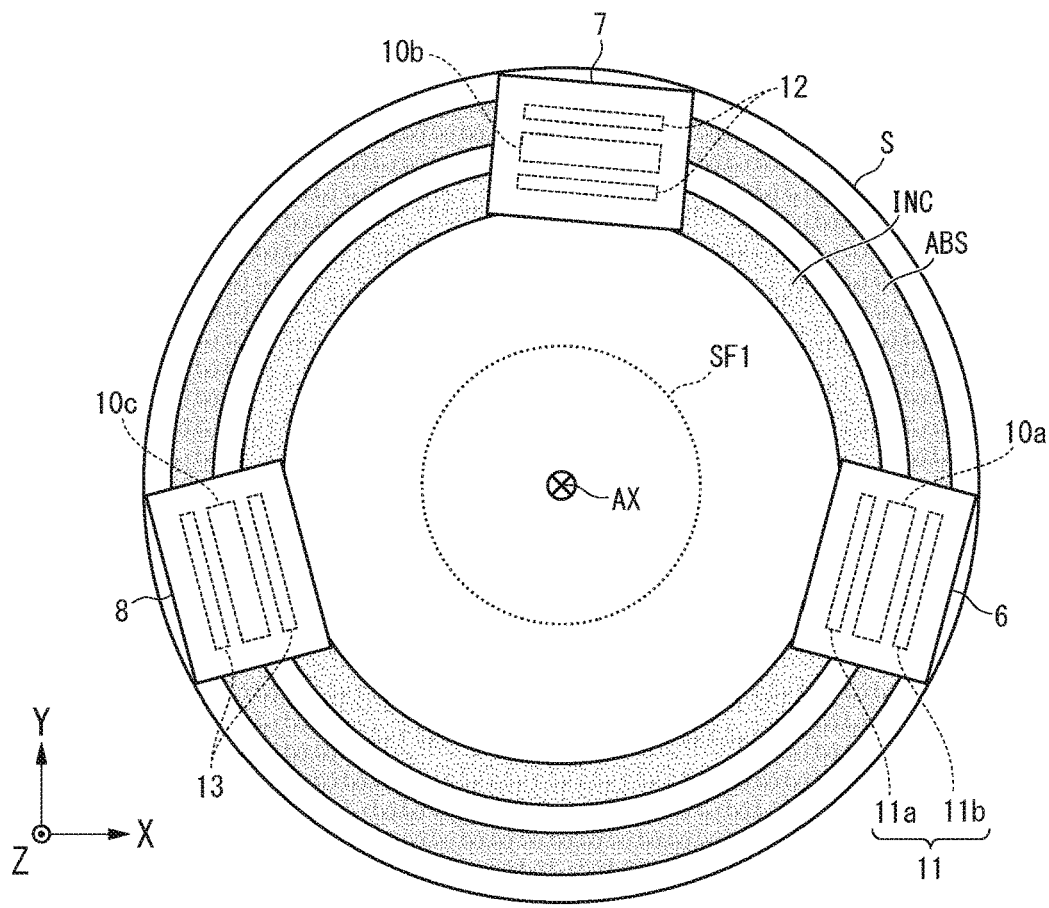
FIGS. 3A and 3B are diagrams showing a scale and detectors according to the first embodiment.
Figure 3B:
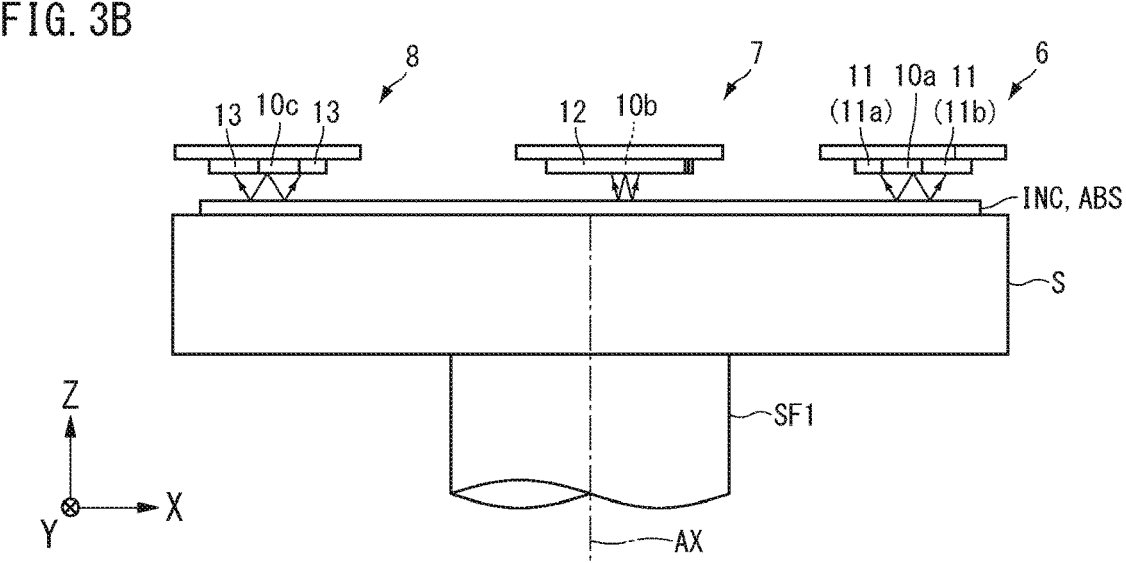

FIGS. 3A and 3B are diagrams showing the scale and the detectors according to the first embodiment. The following description refers to an XYZ orthogonal coordinate system such as one shown in FIGS. 3A and 3B where appropriate. In the XYZ orthogonal coordinate system, the Z direction is a direction parallel with a rotation axis AX of the rotating body SF1. The X direction and the Y direction are each a direction perpendicular to the Z direction. FIG. 3A is a diagram viewed from the direction of the rotation axis AX (the axial direction, or the Z direction). In the following description, the state viewed from the direction of the rotation axis is referred to as a state of rotation axis direction view. FIG. 3B is a diagram viewed from a direction perpendicular to the rotating body SF1 (from a radial direction).

In the present embodiment, the encoder EC includes an optical encoder. The encoder EC optically detects the scale S. The scale S is, for example, a disk-shaped or flange-shaped member. The scale S includes an incremental pattern INC and an absolute pattern ABS of a reflective type or a transmissive type. The incremental pattern INC and the absolute pattern ABS are each of an annular shape. The incremental pattern INC and the absolute pattern ABS are arranged concentrically about the center of the scale S on the XY plane. The encoder EC may be of a configuration which includes a magnetic encoder.

The first head 6, the second head 7, and the third head 8 are arranged so as to surround the rotating body SF1. Each of the first head 6, the second head 7, and the third head 8 is arranged so as to face the incremental pattern INC and the absolute pattern ABS. The first head 6, the second head 7, and the third head 8 are arranged so that the distances thereto from the rotating body SF1 are substantially equal.

The first head 6 includes an irradiator 10a and a first detector 11. The irradiator 10a irradiates both the incremental pattern INC and the absolute pattern ABS with light. The first detector 11 includes a sensor 11a and a sensor 11b. The sensor 11a and the sensor 11b each include a light receiving element (for example, a photodiode, a photoelectric conversion element, a light receiving unit, or a light receiver) for detecting light. The sensor 11a detects light from the incremental pattern INC. The sensor 11b detects light from the absolute pattern ABS.

The second head 7 and the third head 8 are each of a configuration similar to that of the first head 6. The second head 7 includes an irradiator 10b and a second detector 12. The third head 8 includes an irradiator 10c and a third detector 13. The irradiator 10b and the irradiator 10c are each similar to the irradiator 10a mentioned above. The irradiator 10b and the irradiator 10c each irradiate both the incremental pattern INC and the absolute pattern ABS with light. The second detector 12 and the third detector 13 are each of a configuration similar to that of the first detector 11. The second detector 12 and the third detector 13 each detect light from both the incremental pattern INC and the absolute pattern ABS.

As shown in FIG. 3B, the first head 6, the second head 7, and the third head 8 are each a reflective type detection head. The first head 6, the second head 7, and the third head 8 each detect both light reflected by the incremental pattern INC and light reflected by the absolute pattern ABS. The first head 6 may be a transmissive type detection head. In such a case, the first head 6 detects both light transmitted through the incremental pattern INC and light transmitted through the absolute pattern ABS. One or both of the second head 7 and the third head 8 may also be a transmissive type detection head.

Returning to the description of FIG. 1, the first detector 11, the second detector 12, and the third detector 13 are each connected to the processor 3. The first detector 11 outputs a detection signal S1a to the processor 3 as a detection result of having detected the scale S. The second detector 12 outputs a detection signal S2a to the processor 3 as a detection result of having detected the scale S. The third detector 13 outputs a detection signal S3a to the processor 3 as a detection result of having detected the scale S.

The processor 3 processes the detection signals acquired from the detection system 2 (the detection signal S1a, the detection signal S2a, and the detection signal S3a). The processor 3 calculates rotational position information of a detection target rotating body (the rotating body SF1 in FIG. 1 and the rotating body SF2 in FIG. 2), on the basis of the detection signals acquired from the detection system 2. For example, the processor 3 uses a result of detecting light from the absolute pattern ABS to detect angular position information at a first resolution. The processor 3 performs an interpolation computation on the angular position information at the first resolution using the result of detecting the light from the incremental pattern INC, to thereby detect angular position information at a second resolution, which is a resolution higher than the first resolution.

The processor 3 calculates rotational position information S1b of the rotating body SF1, on the basis of the detection signal S1a acquired from the first detector 11. The rotational position information S1b is a detection signal acquired from the first detector 11. The processor 3 calculates rotational position information S2b of the rotating body SF1, on the basis of the detection signal S2a acquired from the second detector 12. The rotational position information S2b is a detection signal acquired from the second detector 12. The processor 3 calculates rotational position information S3b of the rotating body SF1, on the basis of the detection signal S3a acquired from the third detector 13. The rotational position information S3b is a detection signal acquired from the third detector 13.

The processor 3 outputs each of the calculated rotational position information S1b, the rotational position information S2b, and the rotational position information S3b to the calibrator 1. The calibrator 1 calculates error information on the basis of the detection signals acquired respectively from the first detector 11, the second detector 12, and the third detector 13 (for example, the rotational position information S1b, the rotational position information S2b, and the rotational position information S3b). The calibrator 1 outputs the calculated error information to the encoder EC. The memory storage 4 of the encoder EC stores the error information output from the calibrator 1. Each part of the calibrator 1 will be described later.

After the calibration process, the encoder EC is mounted on, for example, a driving device MTR (the rotary body SF2) shown in FIG. 2. The driving device MTR is, for example, an electric motor or the like. The driving device MTR includes the rotating body SF2, a driver MD, and a controller MC. The rotating body SF2 includes, for example, an output shaft (for example, a shaft) in the driving device MTR. The rotating body SF2 may be a working shaft connected to the output shaft of the driving device MTR. The driver MD includes, for example, an armature and a stator and rotates the rotating body SF2. The controller MC controls the driver MD so that at least one of the angular position, the angular velocity, and the angular acceleration of the rotating body SF2 approximates a target value.

The scale S of the encoder EC is attached to the rotating body SF2. The first detector 11 detects the scale S rotating together with the rotating body SF2. The first detector 11 outputs the detection signal S1a to the processor 3 as a detection result of having detected the scale S. The processor 3 calculates the rotational position information S1b of the rotating body SF2, on the basis of the detection signal S1a. The processor 3 outputs the calculated rotational position information S1b to the corrector 5. In the following description, the rotational position information calculated by the processor 3 is referred to as first rotational position information where appropriate. The first rotational position information is pre-correction rotational position information.

The corrector 5 corrects the first rotational position information output from the processor 3 (for example, the rotational position information S1$b$), on the basis of the error information stored in the memory storage (a self-calibration process). For example, the corrector 5 calculates (generates) second rotational position information on the basis of the first rotational position information (for example, the rotational position information S1$b$) and the error information. The second rotational position information is post-correction rotational position information. The corrector 5 outputs the calculated second rotational position information (the post-correction rotational position information). The controller MC of the driving device MTR controls the driver MD on the basis of the second rotational position information.

Here, the error information will be described. The first rotational position information calculated by the processor 3 is, for example, a read value (a measured value) on the basis of the detection result of the detection system 2. The read value may, in some cases, deviate from the true value due to a periodic error (a periodic error component due to rotation) such as a manufacturing error of the scale S and a positional error (for example, an assembly error) between the scale S and the detection system 2. The manufacturing error of the scale S includes deformation in the shape of the absolute pattern ABS or the incremental pattern INC and a positional deviation of the absolute pattern ABS or the incremental pattern INC on the scale S.

The error information includes a calibration value for the read value. The calibration value includes, for example, a value estimated as a true value for the read value (an estimated value of the true value). For example, if the read value is 89° and the calibration value for this read value is 90°, the above error information includes information in which the read value (for example, 89°) and the calibration value (for example, 90°) are paired. When a read value (for example, 89°) is input, the corrector 5 of the encoder EC refers to the error information and outputs a calibration value (for example, 90°) for the read value, thereby correcting the rotational position information.

The error information may include information on an error between a calibration value and a read value. For example, if the read value is 89° and the calibration value for this read value is 90°, the error for the read value is −1°. In such a case, the error information may include information in which the read value (for example, 89°) and the error (for example, −1°) are paired. When a read value (for example, 89°) is input, the corrector 5 of the encoder EC makes reference to the error information and executes a computation to subtract the error for the read value (for example, −1°) from the read value (for example, 89°−(−1°)), thereby correcting the rotational position information.

The above error information may include information on a correction amount for the read value. For example, if the read value is 89° and the calibration value for this read value is 90°, the correction amount for the read value is +1°. In such a case, the error information may include information in which the read value (for example, 89°) and the correction amount (for example, +1°) are paired. When the read value (for example, 89°) is input, the corrector 5 of the encoder EC makes reference to the error information and executes a computation to add the correction amount for the read value (for example, +1°) to the read value (for example, 89°+(+1°)), thereby correcting the rotational position information.

The error information as described above is calculated, for example, by a method using the equal division average method. In such a method, the calculation of the error information uses detection results of detecting a target object from a plurality of detection positions and a plurality of detection positions (positions of detectors (sensors)). When calculating the error information using set values preliminarily set as the plurality of detection positions, the accuracy of the error information decreases, for example, due to the error between the actual detection position and the set value. However, in the case where the actual detection position highly accurately matches the set value in the encoder manufacturing process, for example, the cost involved in positioning increases.

In the present embodiment, the calibrator 1 calculates a relative detection position in the detection system 2 (for example, an angular position about the rotation axis AX of the rotating body as viewed in the rotation axis direction of the rotating body) and generates error information using the calculated detection position (for example, the relative position between the two detectors). For example, even in the case where the detection position of the detection system 2 includes an error with respect to the set value, since the actual detection position calculated by the position calculator 15 is used, it is possible to generate highly accurate error information. Hereunder, each part of the calibrator 1 will be described, with reference to FIG. 1.

The calibrator 1 includes the position calculator 15 and an error calculator 16. The position calculator 15 calculates a relative position between the first detector 11 and the second detector 12 (executes a relative position calculation process), on the basis of detection signals acquired respectively from the first detector 11, the second detector 12, and the third detector 13 (three detection signals in this example). The position calculator 15 uses, as the detection signals acquired respectively from the first detector 11, the second detector 12, and the third detector 13, the rotational position information S1$b$, the rotational position information S2$b$, and the rotational position information S3$b$, for example. The relative position calculation process will be described later, with reference to FIG. 4, Expression (1) to Expression (21), and so forth. The position calculator 15 outputs the calculated relative position to the error calculator 16.

The error calculator 16 calculates the error information on the rotational position information of the rotating body SF1 (executes an error information calculation process), on the basis of the relative position calculated by the position calculator 15 as well as the detection signals acquired from the detection system 2. The error calculator 16 uses, as the detection signals acquired from the detection system 2, at least part of the rotational position information S1$b$, the rotational position information S2$b$, and the rotational position information S3$b$, for example. The error calculator 16 outputs the calculated error information. The calibrator 1 stores the error information output from the error calculator 16 into the memory storage 4 of the encoder EC.

Figure 4:
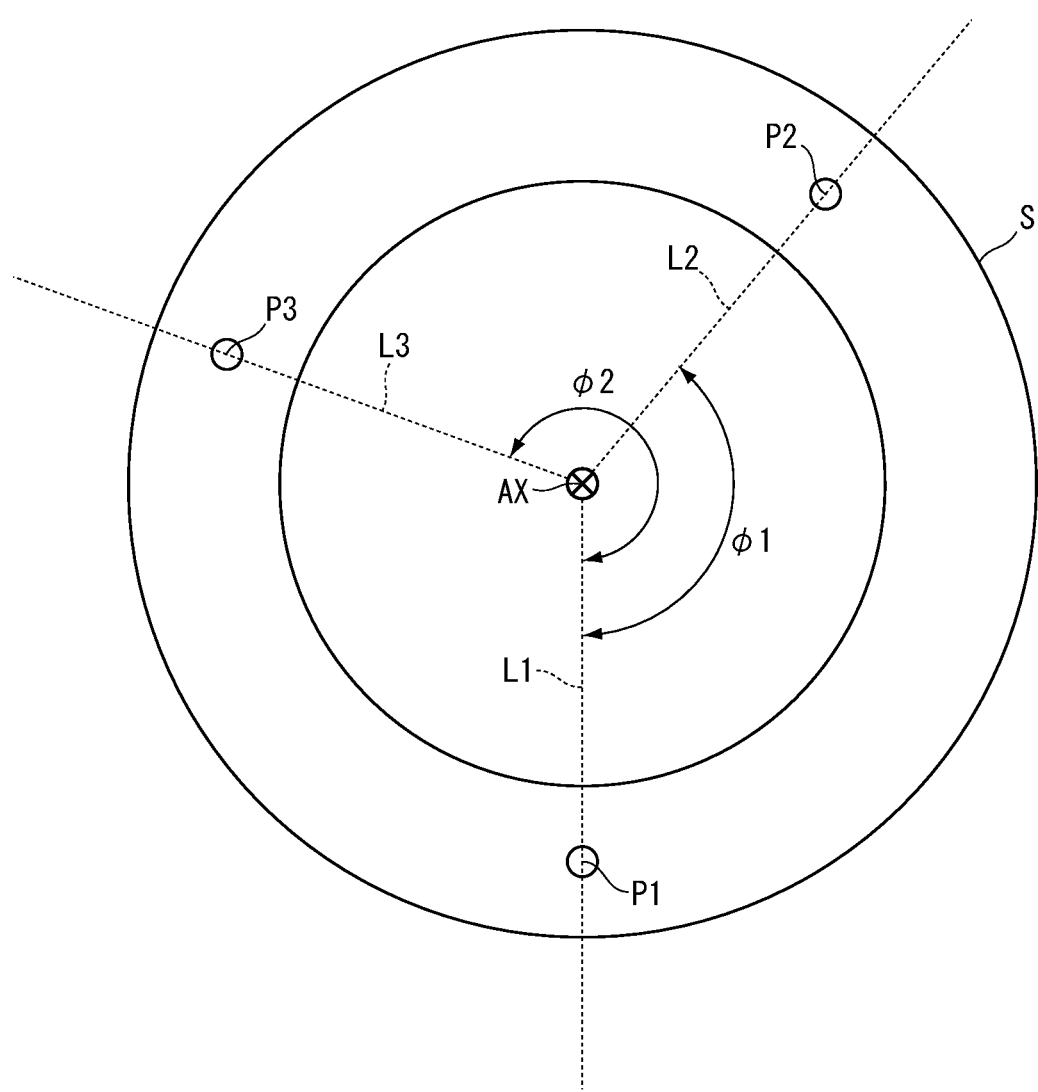
FIG. 4 is a diagram showing parameters of a relative position calculation process according to the first embodiment.

Next, the calibration processes (the relative position calculation process and the error information calculation process) performed by the calibrator 1 will be described. FIG. 4 is a diagram showing parameters used in the relative position calculation process according to the first embodiment.

In FIG. 4, reference sign P1 denotes a position at which the first detector 11 is arranged as viewed in the rotation direction of the scale S or the axial direction of the rotation axis AX and is a detection position (a detection target region) of the first detector 11. The first detector 11 detects light from the detection position P1 on the scale S, for example. For example, the first detector 11 detects an image of the portion of the detection position P1 on the scale S. Reference sign P2 denotes a position at which the second detector 12 is arranged as viewed in the rotation direction of the scale S or the axial direction of the rotation axis AX and is a detection position (a detection target region) of the second detector 12. The second detector 12 detects light from the detection position P2 on the scale S, for example. For example, the second detector 12 detects an image of the portion of the detection position P2 on the scale S. Reference sign P3 denotes a position at which the third detector 13 is arranged as viewed in the rotation direction of the scale S or the axial direction of the rotation axis AX and is a detection position (a detection target region) of the third detector 13. The third detector 13 detects light from the detection position P3 on the scale S, for example. For example, the third detector 13 detects an image of the portion of the detection position P3 on the scale S.

Reference sign φ1 denotes an angle formed by the first detector 11 and the second detector 12 shown in FIG. 3A about the rotation axis AX of the rotating body SF1. The angle φ1 is a difference (a rotation angle) between the angular position of the first detector 11 and the angular position of the second detector 12 in the rotation direction of the scale S. In such a case, the angle φ1 is a parameter which indicates a relative position (a relative angular position) between the first detector 11 and the second detector 12.

The angle φ1 is, for example, an angle formed by a line L1 connecting the rotation axis AX and the detection position P1 and a line L2 connecting the rotation axis AX and the detection position P2 as viewed in the rotation direction of the scale S or the axial direction of the rotation axis AX. The line L1 is, for example, a line which connects a predetermined point in (for example, the center of) a region on the scale S to be detected by the first detector 11 (for example, the detection position P1) and the rotation axis AX on the scale S. The line L2 is, for example, a line which connects a predetermined point in (for example, the center of) a region on the scale S to be detected by the second detector 12 (for example, the detection position P2) and the rotation axis AX on the scale S.

Reference sign φ2 denotes an angle formed by the first detector 11 and the third detector 13 shown in FIG. 3A about the rotation axis AX of the rotating body SF1. The angle φ2 is a difference (a rotation angle) between the angular position of the first detector 11 and the angular position of the third detector 13 in the rotation direction of the scale S. The angle φ2 is a parameter which indicates a relative position (a relative angular position) between the first detector 11 and the third detector 13. The angle φ2 is, for example, an angle formed by the line L1 and a line L3 connecting the rotation axis AX and the detection position P3 as viewed in the rotation direction of the scale S or the axial direction of the rotation axis AX. The line L3 is, for example, a line which connects a predetermined point in (for example, the center of) a region on the scale S to be detected by the third detector 13 (for example, the detection position P3) and the rotation axis AX on the scale S.

In the following description, the read value of the angular position acquired from the first detector 11 (for example, the rotational position information S1b, the measured value) is expressed as f(θ) [rad]. θ is the angular position of the detection position P1 on the circumference about the rotation axis AX. θ is, for example, a value estimated as a true value, that is, a calibration target value (a calibration value). The read value of the angular position acquired from the second detector 12 (for example, the rotational position information S2b, the measured value) is represented by f(θ+φ1) [rad]. The read value of the angular position acquired from the third detector 13 (for example, the rotational position information S3b, the measured value) is expressed as f(θ+φ2) [rad].

f(θ), f(θ+φ1), and f(θ+φ2) mentioned above are each a periodic function having a period of 2π [rad]. f(θ) is expressed as Expression (1) below, using the Fourier series. In the following expressions, n is a natural number (1, 2, 3, ...) representing the harmonic order. An is an amplitude of the n-th harmonic, and αn is an initial phase of the n-th harmonic. N is a number of data points (for example, the number of scale graduations on the scale S).

Expression (1)

$$f(\theta) = \theta + \sum_{n=1}^{N/2} A_n \sin(n\theta + \alpha_n)$$ [Math. 1]

f(θ+φ1) is expressed as Expression (2) below, using the Fourier series.

Expression (2)

$$f(\theta + \phi_1) = \theta + \phi_1 + \sum_{n=1}^{N/2} A_n \sin\{n(\theta + \phi_1) + \alpha_n\}$$ [Math. 2]

f(θ+φ2) is expressed as Expression (3) below, using a Fourier series.

Expression (3)

$$f(\theta + \phi_2) = \theta + \phi_2 + \sum_{n=1}^{N/2} A_n \sin\{n(\theta + \phi_2) + \alpha_n\}$$ [Math. 3]

First, the relative position calculation process will be described, with reference to FIG. 1 and FIG. 4. In the present embodiment, in the relative position calculation process, the position calculator 15 shown in FIG. 1 calculates the relative position between the first detector 11 and the second detector 12 (for example, φ1 in FIG. 4). The position calculator 15 calculates the relative position on the basis of: the difference between the detection signal acquired from the first detector 11 (for example, the rotational position information S1b) and the detection signal acquired from the second detector 12 (for example, the rotational position information S2b); and the difference between the detection signal acquired from the first detector 11 (for example, the rotational position information S1b) and the detection signal acquired from the third detector 13 (for example, the rotational position information S3b). The difference between the rotational position information S1b and the rotational position information S2b is expressed as f(θ+φ1)−f(θ). By taking the difference between Expression (1) and Expression (2) above, Expression (4) below is obtained.

Expression (4)

$$f(\theta + \phi_1) - f(\theta) =$$ [Math. 4]

$$\theta + \phi_1 + \sum_{n=1}^{N/2} A_n \sin\{n(\theta + \phi_1)\alpha_n\} - \theta - \sum_{n=1}^{N/2} A_n \sin(n\theta + \alpha_n) =$$

$$\phi_1 + \sum_{n=1}^{N/2} A_n[\sin\{n(\theta + \phi_1) + \alpha_n\} - \sin(n\theta + \alpha_n)]$$

In the following description, $f(\theta)$ is referred to as a reference waveform (a reference signal, a reference curve) where appropriate. $f(\theta+\varphi 1)-f(\theta)$ is referred to as a differential waveform (differential signal, differential curve) related to the second detector 12, where appropriate. As can be seen from Expression (4) above, the differential waveform related to the second detector 12 is expressed as a superposition of sine waves (the first to the n-th harmonics). By transforming the expression within the square brackets of Expression (4), the following Expression (5) is obtained.

Expression (5)

[Math. 5]

$$A_n[\sin\{n(\theta + \phi_1) + \alpha_n\} - \sin(n\theta + \alpha_n)]$$

$$= 2A_n \cos\frac{\{n(\theta + \phi_1) + \alpha_n\} + (n\theta + \alpha_n)}{2} \cdot \sin\frac{\{n(\theta + \phi_1) + \alpha_n\} - (n\theta + \alpha_n)}{2}$$

$$= 2A_n \cos\left\{n\theta + \frac{n\phi_1}{2} + \alpha_n\right\}\sin\frac{n\phi_1}{2}$$

$$= 2A_n \sin\frac{n\phi_1}{2}\sin\left\{n\theta + \left(\frac{n\phi_1}{2} + \alpha_n + \frac{\pi}{2}\right)\right\}$$

Here, the amplitude of the n-th harmonic in the differential waveform related to the second detector 12 is Bn1. Bn1 is expressed as Expression (6) below.

Expression (6)

$$B_{n1} = 2A_n \sin\frac{n\phi_1}{2}$$ [Math. 6]

βn1 is taken as the amount of change to nθ with respect to the phase of the n-th harmonic in the differential waveform related to the second detector 12. βn1 is a difference between the phase of the n-th harmonic related to the second detector 12 and nθ. βn1 is expressed as Expression (7) below.

Expression (7)

$$\beta_{n1} = \frac{n\phi_1}{2} + \alpha_n + \frac{\pi}{2}$$ [Math. 7]

The difference between the rotational position information S1*b* and the rotational position information S3*b* is expressed as $f(\theta+\varphi 2)-f(\theta)$. In the following description, $f(\theta+\varphi 2)-f(\theta)$ is referred to as a differential waveform (differential signal, differential curve) related to the third detector 13, where appropriate. By taking the difference between Expression (1) and Expression (3) above, the differential waveform related to the third detector 13 is obtained. The differential waveform related to the third detector 13 is transformed in a manner similar to that of the differential waveform related to the second detector 12, and Bn2 is taken as the amplitude of the n-th harmonic in the differential waveform related to the third detector 13. Bn2 is expressed as Expression (8) below.

Expression (8)

$$B_{n2} = 2A_n \sin\frac{n\phi_2}{2}$$ [Math. 8]

βn2 is taken as the amount of change to nθ with respect to the phase of the n-th harmonic in the differential waveform related to the third detector 13. βn2 is a difference between the phase of the n-th harmonic related to the third detector 13 and nθ. βn2 is expressed as Expression (9) below.

Expression (9)

$$\beta_{n2} = \frac{n\phi_2}{2} + \alpha_n + \frac{\pi}{2}$$ [Math. 9]

By solving for An using Expression (6) and Expression (8), Expression (10) below is obtained.

Expression (10)

$$A_n = \frac{B_{n1}}{2\sin(n\phi_1/2)} = \frac{B_{n2}}{2\sin(n\phi_2/2)}$$ [Math. 10]

By transforming Expression (10), Expression (11) below is obtained.

Expression (11)

$$B_{n2}\sin\frac{n\phi_1}{2} = B_{n1}\sin\frac{n\phi_2}{2}$$ [Math. 11]

By solving for an using Expression (7) and Expression (9), Expression (12) below is obtained.

Expression (12)

$$\alpha_n = \beta_{n1} - \frac{n\phi_1}{2} - \frac{\pi}{2} = \beta_{n2} - \frac{n\phi_2}{2} - \frac{\pi}{2}$$ [Math. 12]

By transforming Expression (12), Expression (13) below is obtained.

Expression (13)

$$\frac{n\phi_2}{2} = \frac{n\phi_1}{2} - \beta_{n1} + \beta_{n2}$$ [Math. 13]

The angle φ1 which indicates the relative position between the first detector 11 and the second detector 12 and the angle φ2 which indicates the relative position between the first detector 11 and the third detector 13 are calculated by simultaneously solving Expression (11) and Expression (13). By substituting the right side of Expression (13) into Expression (11) to thereby eliminate the angle φ2 from Expression (11), Expression (14) below is obtained.

Expression (14)

$$\beta_{n2}\sin\frac{n\phi_1}{2} = \beta_{n1}\sin\left(\frac{n\phi_1}{2} - \beta_{n1} + \beta_{n2}\right) = \quad \text{[Math. 14]}$$
$$\beta_{n1}\cos(\beta_{n1} - \beta_{n2})\sin\frac{n\phi_1}{2} - B_{n1}\sin(\beta_{n1} - \beta_{n2})\cos\frac{n\phi_1}{2}$$

By transforming Expression (14), Expression (15) below is obtained.

Expression (15)

$$\{\beta_{n2} - \beta_{n1}\cos(\beta_{n1} - \beta_{n2})\}\sin\frac{n\phi_1}{2} + B_{n1}\sin(\beta_{n1} - \beta_{n2})\cos\frac{n\phi_1}{2} = \quad \text{[Math. 15]}$$
$$C_{n1}\sin\left(\frac{n\phi_1}{2} + \gamma_{n1}\right) = 0$$

Cn1 in Expression (15) is expressed as Expression (16) below.

Expression (16)

$$C_{n1} = \sqrt{\{B_{n2} - B_{n1}\cos(\beta_{n1} - \beta_{n2})\}^2 + \{B_{n1}\sin(\beta_{n1} - \beta_{n2})\}^2} \quad \text{[Math. 16]}$$

γn1 in Expression (15) is expressed as Expression (17) below.

Expression (17)

$$\gamma_{n1} = \tan^{-1}\frac{B_{n1}\sin(\beta_{n1} - \beta_{n2})}{B_{n2} - B_{n1}\cos(\beta_{n1} - \beta_{n2})} \quad \text{[Math. 17]}$$

In Expression (15), sin(nφ1/2+γn1)=0 is established under the condition that Cn1 is not 0. In such a case, Expression (18) below is established using a natural number m.

Expression (18)

$$\frac{n\phi_1}{2} + \gamma_{n1} = (m-1)\pi \quad \text{[Math. 18]}$$

By transforming Expression (18), φ1 is expressed as Expression (19) below.

Expression (19)

$$\phi_1 = \frac{2}{n}\{(m-1)\pi - \gamma_{n1}\} \quad \text{[Math. 19]}$$

Here, the solution for φ1 within a range from greater than 0 to 2n or less is expressed as φ1 (n=k) where n=k. For example, the solution for φ1 which satisfies n=1 as well as 0<φ1≤2π is expressed as φ1 (n=1). For the first order component (where n=1), the condition which satisfies 0<φ1≤2π is m=1. φ1 (n=1) is uniquely determined and is expressed as Expression (20) below.

Expression (20)

$$\phi_{1(n=1)} = -2\gamma_{n1} \quad \text{[Math. 20]}$$

For the second and higher order components (where n is 2 or more), the number of solutions for φ1 is the same as n. For example, where n is 3, φ1 (n=3) is expressed as Expression (21) below, and there are three solutions including solutions which respectively correspond to m=1, 2, and 3.

Expression (21)

$$\phi_{1(n=3)} = \frac{2}{3}(m-1)\pi - \frac{2}{3}\gamma_{n1} \quad \text{[Math. 21]}$$

As described above, when a plurality of solutions can be obtained, the solution for φ1 (n=k) may be calculated for each of two or more values of m among m=1, 2, ... k, and φ1 may be specified on the basis of the plurality of obtained solutions for φ1 (n=k). For example, where n=3, the solution for φ1 (n=3) is calculated for each of m=1, 2, and 3. Then, among the plurality of solutions for φ1 (n=3), the solution having the value closest to φ1 (n=1) obtained from Expression (20) may be adopted as the solution for φ1 (n=3). The value computed from the plurality of solutions for φ1 (n=3) (for example, the average value) may be adopted as the solution for φ1 (n=3).

The 0-th order (n=0) component is a direct current component and is prone to the influence of noise, for example. With use of the first or higher order component, for example, the angle φ1 can highly accurately be calculated (specified). While n is a natural number (1, 2, ... ) in the present embodiment, it may include 0. For example, when the scale S includes the absolute pattern ABS, the angle φ1 may be calculated using the 0-th order component. Also, when the scale S includes the incremental pattern INC and does not include the absolute pattern ABS, φ1 may be calculated using the 0-th order component where the scale S is at a predetermined angular position (for example, at the reference position, at 0°, or at the point of origin).

In the present embodiment, the position calculator 15 shown in FIG. 1 also calculates the relative position between the first detector 11 and the third detector 13 (for example, the φ2 in FIG. 4). Hereunder, the solution for φ2 will be described. By eliminating φ1 from Expression (11) using Expression (12), Expression (22) below is obtained.

Expression (22)

$$\beta_{n1}\sin\frac{n\phi_2}{2} = B_{n2}\sin\left(\frac{n\phi_2}{2} + \beta_{n1} - \beta_{n2}\right) = \quad \text{[Math. 22]}$$
$$B_{n2}\cos(\beta_{n1} - \beta_{n2})\sin\frac{n\phi_2}{2} + B_{n2}\sin(\beta_{n1} - \beta_{n2})\cos\frac{n\phi_2}{2}$$

By transforming Expression (22), the following Expression (23) is obtained.

Expression (23)

$$\{B_{n2}\cos(\beta_{n1} - \beta_{n2}) - \beta_{n1}\}\sin\frac{n\phi_2}{2} + B_{n2}\sin(\beta_{n1} - \beta_{n2})\cos\frac{n\phi_2}{2} = \quad \text{[Math. 23]}$$

$$C_{n2}\sin\left(\frac{n\phi_2}{2} + \gamma_{n2}\right) = 0$$

Cn2 in Expression (23) is expressed as Expression (24) below.

Expression (24)

$$C_{n2} = \sqrt{\{B_{n2}\cos(\beta_{n1} - \beta_{n2}) - \beta_{n1}\}^2 + \{B_{n2}\sin(\beta_{n1} - \beta_{n2})\}^2} \quad \text{[Math. 24]}$$

γn2 in Expression (23) is expressed as Expression (25) below.

Expression (25)

$$\gamma_{n2} = \tan^{-1}\frac{B_{n2}\sin(\beta_{n1} - \beta_{n2})}{B_{n2}\cos(\beta_{n1} - \beta_{n2}) - B_{n1}} \quad \text{[Math. 25]}$$

In Expression (23), sin(nφ2/2+γn2)=0 is established under the condition that Cn2 is not 0. In such a case, the following Expression (26) is established using a natural number m.

Expression (26)

$$\frac{n\phi_2}{2} + \gamma_{n2} = (m-1)\pi \quad \text{[Math. 26]}$$

Here, the solution for φ2 within a range from greater than 0 to 2π or less is expressed as φ2 (n=k) where n=k. For example, the solution for φ2 when satisfying n=1 as well as 0<φ2≤2π is expressed as φ2 (n=1). For the first order component (where n=1), the condition which satisfies 0<φ2≤2π is m=1. φ2 (n=1) is uniquely determined and is expressed as Expression (27) below.

Expression (27)

$$\phi_2 = -2\gamma_{n2} \quad \text{[Math. 27]}$$

As described regarding the solution for φ1, for the second or higher order component (when n is 2 or more), the solution for φ2 (n=k) may be calculated for each of two or more values of m among m=1, 2, ... k, and φ2 may be specified on the basis of the plurality of obtained solutions for φ2 (n=k).

Next, the error information calculation process will be described. If φ1 calculated as described above is substituted into Expression (10) mentioned above, An becomes known. If φ1 calculated by the relative position calculation process is substituted into Expression (12) mentioned above, an becomes known. Here, the harmonic component (the second term on the right side) in Expression (1) mentioned above is represented as Err. Err is expressed as Expression (28) below and is calculated using An and αn which have become known.

Expression (28)

$$Err = \sum_{n=1}^{N/2} A_n \sin(n\theta + \alpha_n) \quad \text{[Math. 28]}$$

Err is an error curve which represents the difference (error) between the measured value f(θ) and the true value θ. Using f(θ) acquired from the detection result of the first detector 11 and the calculated Err, the true value θ is calculated by Expression (29) below.

Expression (29)

$$\theta = f(\theta) - Err \quad \text{[Math. 29]}$$

The error calculator 16 shown in FIG. 1 calculates θ (a calibration value) using f(θ) and the calculated Err (error). The error calculator 16 generates, as error information, information in which f(θ) and θ are paired, for example. For example, the error calculator 16 calculates An and αn on the basis of φ1. The error calculator 16 calculates Err using An and αn calculated on the basis of φ1. In the following description, Err calculated on the basis of φ1 will be referred to as Err1 where appropriate.

The error calculator 16 calculates θ using f(θ) and Err1. In the following description, θ calculated on the basis of φ1 will be referred to as θ where appropriate. The error calculator 16 generates, as first error information, information in which f(θ) and θ are paired.

Err can also be calculated from φ2. For example, if calculated φ2 is substituted into Expression (10) mentioned above, An becomes known. If calculated φ2 is substituted into Expression (12) mentioned above, an becomes known. For example, the error calculator 16 calculates An and αn on the basis of φ2. The error calculator 16 calculates Err using An and αn calculated on the basis of φ2. In the following description, Err calculated on the basis of φ2 will be referred to as Err2 where appropriate. The error calculator 16 calculates θ using f(θ) and Err2. In the following description, θ calculated on the basis of φ2 will be referred to as θ2 where appropriate. The error calculator 16 generates, as second error information, information in which f(θ) and θ2 are paired.

The error calculator 16 calculates error information on the basis of the first error information and the second error information. For example, the error calculator 16 calculates the error information on the basis of: the amplitude of the difference between the first detection signal (for example, the rotational position information S1b, f(θ)) and the second detection signal (for example, the rotational position information S2b, f(θ+φ1)); and the amplitude of the difference between the first detection signal and the third detection signal (for example, the rotational position information S3b, f(θ+φ2)). For example, the difference between the first detection signal and the second detection signal is f(θ+φ1)−f(θ), and the amplitude thereof is Bn1. The difference between the first detection signal and the third detection signal is f(θ+φ2)−f(θ), and the amplitude thereof is Bn2.

The error calculator 16 may select θ or θ2 as θ on the basis of the magnitude relationship between Bn1 and Bn2. For example, the error calculator 16 may compare Bn1 and Bn2 and may select (adopt) θ corresponding to Bn1 as θ if the value of Bn1 is greater. The error calculator 16 may calculate an average value (for example, an addition average value, a weighted average value) of θ and θ2 as θ. For example, the error calculator 16 may adopt the addition average value (θ+θ2)/2 as θ. The error calculator 16 may calculate θ by weighting with use of Bn1 and Bn2. For example, the error calculator 16 may adopt the weighted average value (Bn1×θ1+Bn2×θ2)/(Bn1+Bn2) as θ.

When the error calculator 16 calculates the error information on the basis of the first error information and the second error information, for example, it is possible to reduce influence of errors arising at the time of acquiring read values (for example, noises, quantization errors) as well as errors arising at the time of calculating error information (for example, rounding errors). The error calculator 16 may calculate either one of the first error information and the second error information as error information. For example, the error calculator 16 may calculate the first error information as the error information and may not calculate the second error information.

The error calculator 16 may generate, as the error information, information in which f(θ) and Err (error) are paired. The error calculator 16 may generate, as the error information, information in which f(θ) and a correction amount (for example, −Err) calculated from Err are paired.

The error calculator 16 may calculate Err on the basis of the first error information and the second error information. The error calculator 16 may select Err1 or Err2 as Err on the basis of Bn1 and Bn2. For example, the error calculator 16 may compare Bn1 and Bn2 and may select Err1 corresponding to Bn1 as Err if the value of Bn1 is greater.

The error calculator 16 may calculate an average value (for example, an addition average value, a weighted average value) of Err1 and Err2 as Err. The error calculator 16 may calculate Err by weighting with use of Bn1 and Bn2. For example, the error calculator 16 may calculate the weighted average value (Bn1×Err1+Bn2×Err2)/(Bn1+Bn2) as Err.

Here, the set value of the relative position between the first detector 11 and the second detector 12 (for example, φ1), and the set value of the relative position between the first detector 11 and the third detector 13 (for example, φ2) are described. In the present embodiment, where i is an integer 2 or more, the error calculator 16 calculates an error of an i-th order component of the Fourier series representing a detection result of the first detector 11. When the set value of φ1 and the set value of φ2 are set to an angle which divides the circumference into i equal parts, the Fourier series of the difference (for example, f(θ+φ1)−f(θ), f(θ+φ2)−f(θ)) does not include a component of an order which is an integral multiple of i. Therefore, one or both of the set value of φ1 and the set value of φ2 are set to an angle other than $2\pi/j \times i$ [rad], where j is an integer 2 or more.

Figure 5:
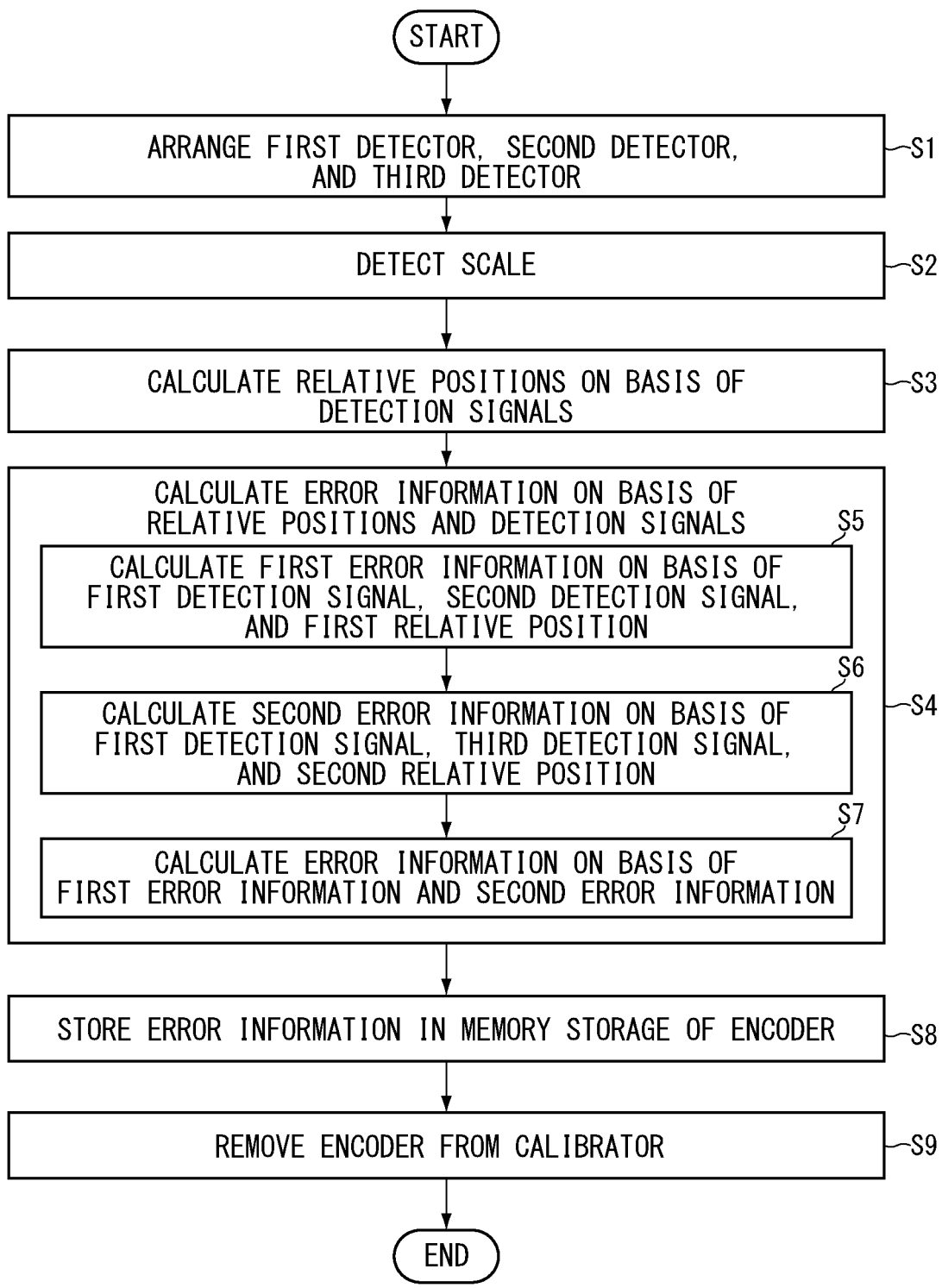
FIG. 5 is a flowchart showing an encoder manufacturing method according to the embodiment.

Next, an encoder manufacturing method according to the embodiment is described on the basis of configurations of the encoder EC and the calibrator 1. FIG. 5 is a flowchart showing the encoder manufacturing method according to the embodiment. Where appropriate, reference to FIG. 1 and so forth will be made for each part of the encoder EC and each part of the calibrator 1.

In Step S1, the first detector 11, the second detector 12, and the third detector 13 (see FIG. 1) are each positioned with respect to the scale S. In Step S2, the scale S is rotated at least by one round (one rotation), and the first detector 11, the second detector 12, and the third detector 13 each detect the scale S. The first detector 11, the second detector 12, and the third detector 13 each output a detection signal to the processor 3 (see FIG. 1).

The processor 3 processes the detection result of the first detector 11 and calculates rotational position information S1b (for example, f(θ)). The processor 3 processes the detection result of the second detector 12 and calculates rotational position information S2b (for example, f(θ+φ1)). The processor 3 processes the detection result of the third detector 13 and calculates rotational position information S3b (for example, f(θ+φ2)). The processor 3 outputs, as the detection signals acquired respectively from the first detector 11, the second detector 12, and the third detector 13, the rotational position information S1b, the rotational position information S2b, and the rotational position information S3b to the calibrator 1 (see FIG. 1).

The encoder manufacturing method according to the present embodiment includes calibrating the encoder (executing the calibration process) by means of a calibration method according to the embodiment. The calibration process includes the process of Step S3 in FIG. 5 (the relative position calculation process) and the process of Step S4 (the error information calculation process).

In Step S3, the position calculator 15 (see FIG. 1) calculates a relative position between the first detector 11 and the second detector 12 (for example, a first relative position, φ1), on the basis of the detection signal from the encoder EC (for example, the processor 3). The position calculator 15 according to the present embodiment calculates φ1 by means of the method described in Expression (1) to Expression (21). The position calculator 15 according to the present embodiment calculates the relative position between the first detector 11 and the third detector 13 (for example, a second relative position, φ2) by means of the method described in Expression (22) to Expression (27).

In Step S4, the error calculator 16 (see FIG. 1) calculates error information on the basis of the relative position calculated by the position calculator 15 and a detection signal from the encoder EC (for example, rotational position information). In the present embodiment, the process of Step S4 (the error information calculation process) includes processes of Step S5 to Step S7.

In Step S5, the error calculator 16 calculates the first error information on the basis of the first detection signal (for example, the rotational position information S1b, f(θ)), the second detection signal (for example, the rotational position information S2b, f(θ+φ1)), and the first relative position (for example, φ1). The first error information includes, for example, information in which f(θ) and θ calculated from φ1 are associated with each other.

In Step S6, the error calculator 16 calculates the second error information on the basis of the second detection signal (for example, the rotational position information S1b, f(θ)), the third detection signal (for example, the rotational position information S3b, f(θ+φ2)), and the second relative position (for example, φ2). The second error information includes, for example, information in which f(θ) and θ2 calculated from φ2 are associated with each other.

In Step S7, the error calculator 16 calculates the above error information on the basis of the first error information and the second error information. The error information includes, for example, information in which the read value f(θ) and the calibration value θ1 are associated with each other. The error calculator 16 may calculate, as θ, an average value (for example, an addition average value, a weighted average value) of θ1 in the first error information and θ2 in the second error information to calculate the error information. The error calculator 16 may select θ1 in the first error information or θ2 in the second error information as θ and may generate error information. The calibrator 1 (see FIG. 1) outputs the error information calculated by the error calculator 16. In Step S8, the calibrator 1 stores the error information calculated by the error calculator 16 into the memory storage 4 of the encoder EC (see FIG. 1).

In Step S9, the encoder EC is removed from the calibrator 1, for example. Having been removed from the calibrator 1, the encoder EC is attached, for example, to the detection target rotating body SF2 (see FIG. 2). At least a part of the detection system 2 of the encoder EC detects the scale S attached to the rotating body SF2. For example, the first detector 11 shown in FIG. 2 detects the scale S and outputs a detection signal S1a. One or both of the second detector 12 and the third detector 13 may not detect the scale S attached to the rotating body SF2.

The processor 3 calculates first rotational position information of the rotating body SF2, on the basis of the detection signal output from the detection system 2. For example, the processor 3 calculates rotational position information S1b, on the basis of the detection signal S1a acquired from the first detector 11. The processor 3 outputs the calculated rotational position information to the corrector 5. The corrector 5 corrects the rotational position information calculated by the processor 3, on the basis of the error information stored in the memory storage 4. The encoder EC then outputs the post-correction rotational position information to an outside device (for example, controller MC).

In Step S3 of FIG. 5, the position calculator 15 need not calculate the relative position between the first detector 11 and the third detector 13 (for example, the second relative position, $\varphi 2$). In such a case, in Step S4, the error calculator 16 may calculate the first error information as the error information and need not execute the process of Step S6 and the process of Step S7.

The encoder EC according to the present embodiment may include at least part of the calibrator 1 (for example, the position calculator 15, or the error calculator 16). For example, the encoder EC may include: the scale S attached to the rotating body SF1; the first detector 11, the second detector 12, and the third detector 13 positioned with respect to the scale S; the position calculator 15 which calculates a relative position between the first detector 11 and the second detector 12 on the basis of detection signals acquired respectively from the first detector 11, the second detector 12, and the third detector 13; and the error calculator 16 which calculates error information on the rotational position information of the rotating body SF1, on the basis of the relative position calculated by the position calculator 15 as well as the detection signals.

The third detector 13 may be positioned with respect to the scale S after the completion of the detection process performed by the second detector 12. For example, the angular position of the second detector 12 may be changed after the completion of the detection process and the second detector 12 may be positioned as the third detector 13. The position calculator 15 may calculate the relative position between the first detector 11 and the second detector 12, using a detection signal acquired from the second detector 12 after the angular position thereof has been changed, as a detection signal from the third detector 13. Since the calibrator 1 according to the embodiment calculates the relative position in the detection system 2, even when the angular position of the second detector 12 is changed, the error information can still be calculated highly accurately.

The position calculator 15 may calculate the relative position between the first detector 11 and the second detector 12, using the detection signal S1a, the detection signal S2a, and the detection signal S3a as detections signals from the detection system 2.

Second Embodiment

Figure 6A:
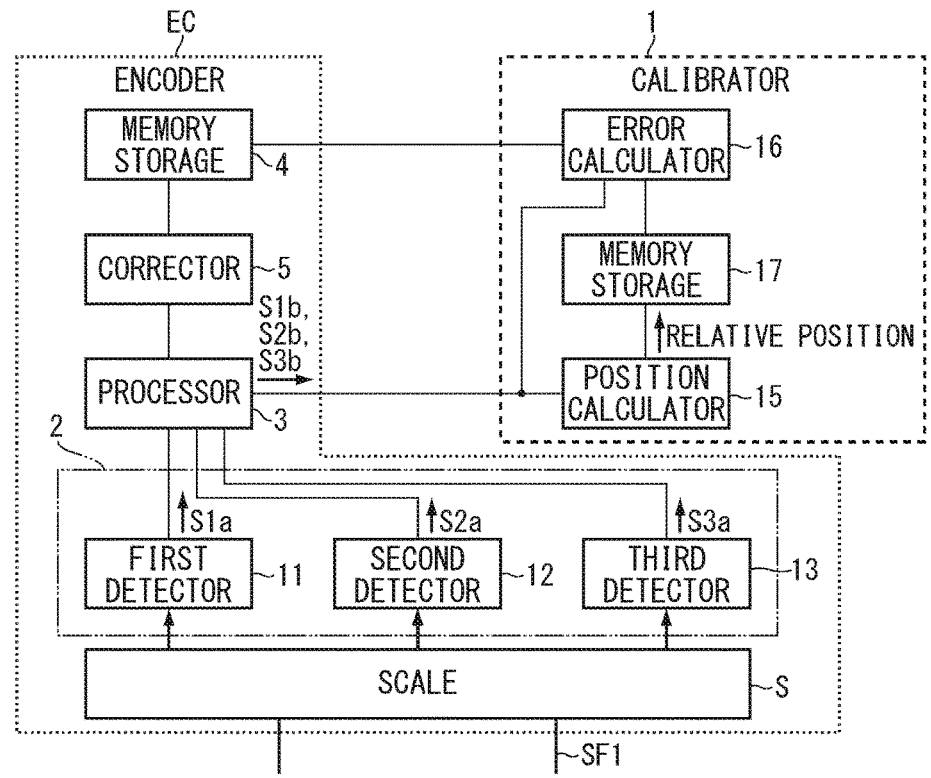
FIGS. 6A and 6B are diagrams showing an encoder and a calibrator according to a second embodiment.
Figure 6B:
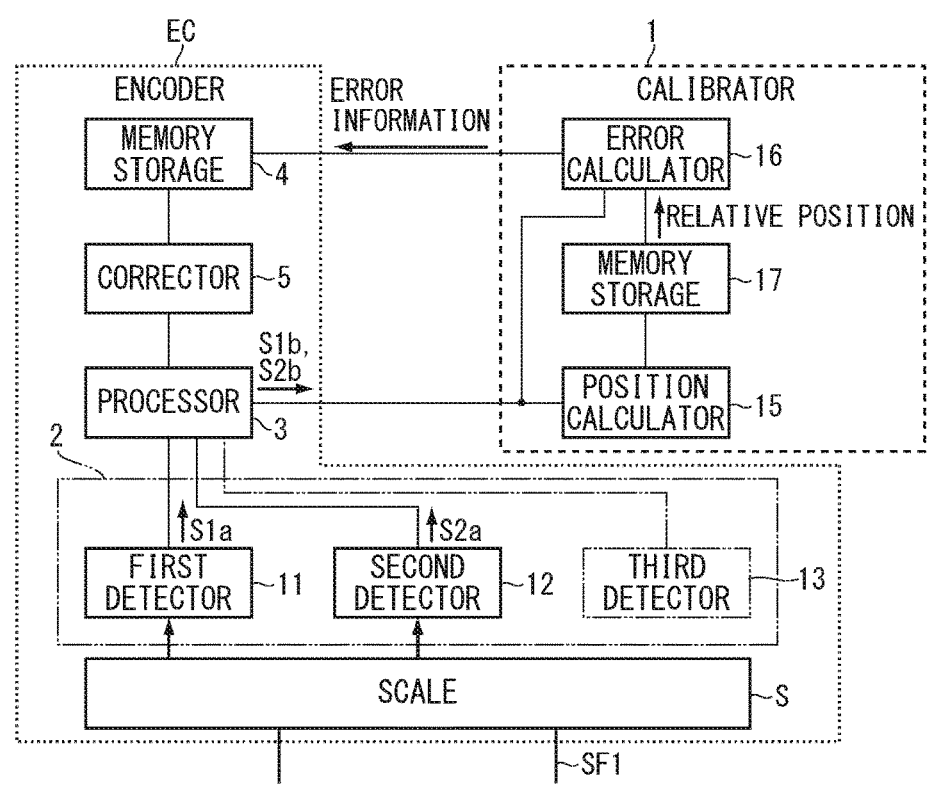

Next, a second embodiment will be described. In the present embodiment, the same reference signs are given to the same configurations as those in the embodiment described above, and the descriptions thereof will be omitted or simplified. FIGS. 6A and 6B are diagrams showing an encoder and a calibrator according to the second embodiment. In the present embodiment, at least one of the first detector 11, the second detector 12, and the third detector 13 can be removed from the detection system 2. FIG. 6A shows a state where the first detector 11, the second detector 12, and the third detector 13 are provided in the detection system 2. FIG. 6B shows a state where the third detector 13 has been removed from the detection system 2.

In the state of FIG. 6A, the first detector 11, the second detector 12, and the third detector 13 each detect the scale S. The first detector 11 outputs a detection signal S1a to the processor 3. The second detector 12 outputs a detection signal S2a to the processor 3. The third detector 13 outputs a detection signal S3a to the processor 3. The processor 3 outputs, as detection signals acquired from the detection system 2, rotational position information S1b on the basis of the detection signal S1a, rotational position information S2b on the basis of the detection signal S2a, and rotational position information S3b on the basis of the detection signal S3a, to the calibrator 1.

The calibrator 1 includes the position calculator 15, the error calculator 16, and a memory storage 17. The position calculator 15 of the calibrator 1 calculates a relative position between the first detector 11 and the second detector 12 (for example, $\varphi 1$), on the basis of the rotational position information S1b, the rotational position information S2b, and the rotational position information S3b. The position calculator 15 stores the calculated relative position between the first detector 11 and the second detector 12 into the memory storage 17. Here, as shown in FIG. 6B, the third detector 13 is removed from the detection system 2 after the detection result used for the relative position calculation process performed by the position calculator 15 has been acquired.

In the state of FIG. 6B, the first detector 11 and the second detector 12 each detect the scale S. The first detector 11 outputs the detection signal S1a to the processor 3. The second detector 12 outputs the detection signal S2a to the processor 3. The processor 3 outputs, as detection signals acquired from the detection system 2, the rotational position information S1b on the basis of the detection signal S1a and the rotational position information S2b on the basis of the detection signal S2a, to the calibrator 1.

The error calculator 16 of the calibrator 1 calculates error information, on the basis of: the relative position calculated in FIG. 6A by the position calculator 15; as well as the rotational position information S1b and the rotational position information S2b output in FIG. 6B from the processor 3. The error calculator 16 reads the relative position calculated in FIG. 6A by the position calculator 15 from the memory storage 17 and calculates error information on the basis of the read relative position as well as the rotational position information S1b and the rotational position information S2b. The calibrator 1 stores the error information calculated by the error calculator 16 into the memory storage 4 of the encoder EC.

Third Embodiment

Figure 7A:
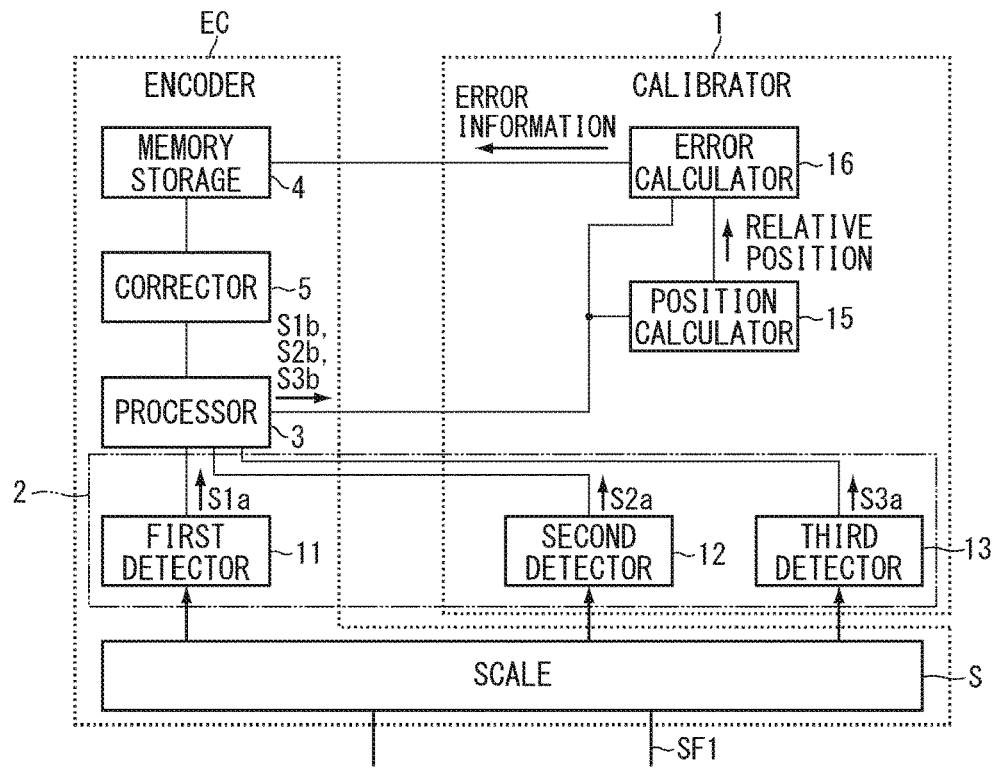
FIGS. 7A and 7B are diagrams showing an encoder and a calibrator according to a third embodiment.
Figure 7B:
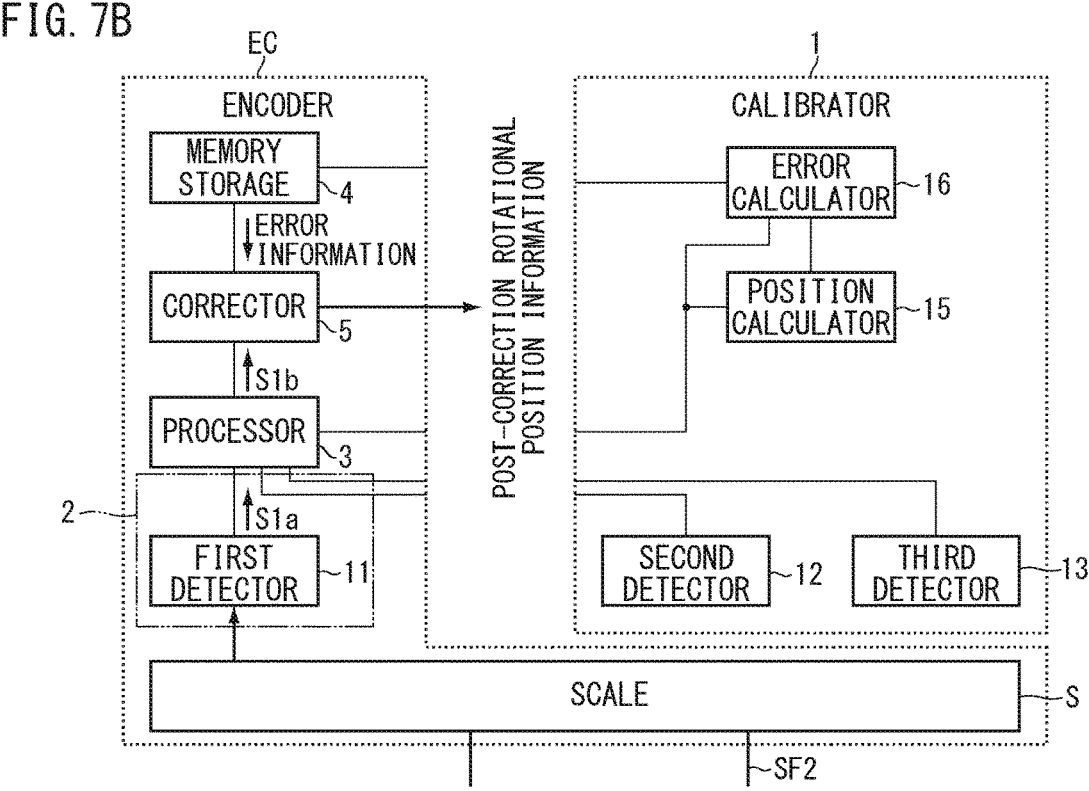

Next, a third embodiment will be described. In the present embodiment, the same reference signs are given to the same configurations as those in the embodiments described above, and the descriptions thereof will be omitted or simplified. FIGS. 7A and 7B are diagrams showing an encoder and a calibrator according to the third embodiment. In the present embodiment, the detection system 2 (the first detector 11, the second detector 12, and the third detector 13) is separated into the encoder EC and the calibrator 1. In FIGS. 7A and 7B, the encoder EC includes the first detector 11. The calibrator 1 includes the second detector 12 and the third detector 13. The second detector 12 and the third detector 13 can be removed from the detection system 2.

In FIG. 7A, the scale S is attached to the rotating body SF1 (the first rotating body). The first detector 11, the second detector 12, and the third detector 13 each detect the scale S. The first detector 11 outputs a detection signal S1a to the processor 3. The second detector 12 outputs a detection signal S2a to the processor 3. The third detector 13 outputs a detection signal S3a to the processor 3. The processor 3 outputs, as detection signals acquired from the detection system 2, rotational position information S1b on the basis of the detection signal S1a, rotational position information S2b on the basis of the detection signal S2a, and rotational position information S3b on the basis of the detection signal S3a, to the calibrator 1.

The position calculator 15 of the calibrator 1 calculates a relative position between the first detector 11 and the second detector 12 (for example, φ1), on the basis of the rotational position information S1b, the rotational position information S2b, and the rotational position information S3b. The error calculator 16 calculates error information on the basis of the relative position calculated by the position calculator 15 and the detection signals acquired upon the detection system 2 detecting the scale S (for example, the rotational position information S1b, the rotational position information S2b, and the rotational position information S3b). The calibrator 1 stores the error information calculated by the error calculator 16 into the memory storage 4 of the encoder EC.

The encoder EC is removed from the calibrator 1 after the memory storage 4 has stored the error information. As a result of the encoder EC having been removed from the calibrator 1, the second detector 12 and the third detector 13 are removed from the detection system 2 as shown in FIG. 7B. In FIG. 7B, the scale S is attached to the rotating body SF2 (the second rotating body). The rotating body SF2 may be the same as the rotating body SF1 in FIG. 7A or may be different from the rotating body SF1.

The first detector 11 detects the scale S attached to the rotating body SF2. The first detector 11 outputs a detection signal S1a to the processor 3. The processor 3 calculates rotational position information S1b of the rotating body SF2, on the basis of the detection signal S1a. The processor 3 outputs the calculated rotational position information S1b to the corrector 5. The corrector 5 reads the error information from the memory storage 4 and corrects the rotational position information S1b of the rotating body SF2 on the basis of the error information. The encoder EC outputs the post-correction rotational position information to the outside.

Fourth Embodiment

Figure 8A:
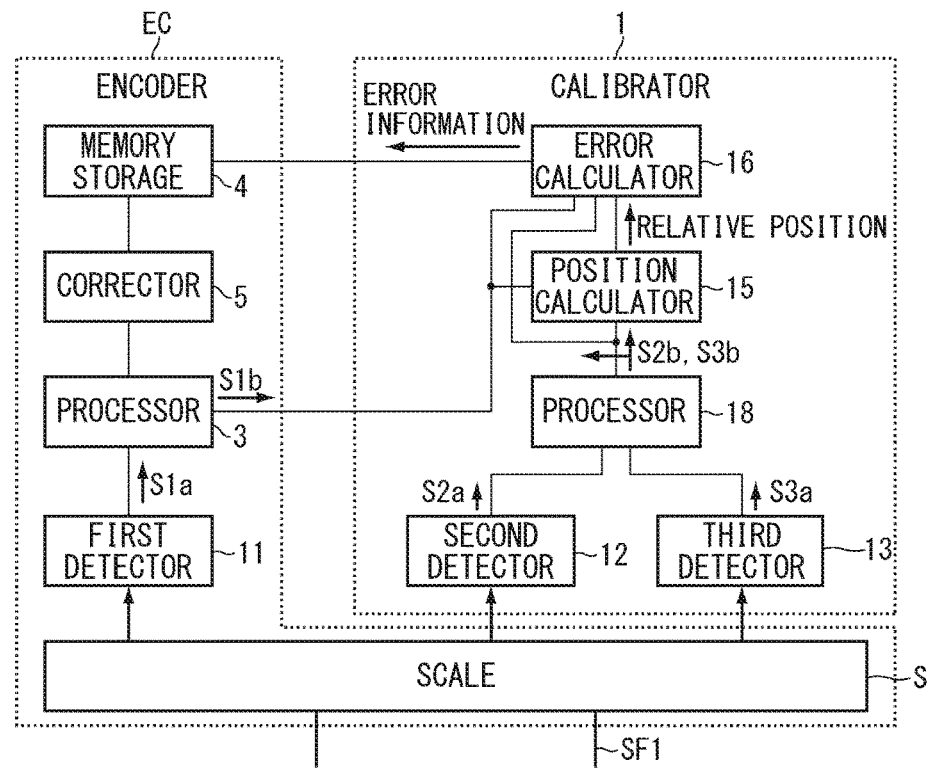
FIGS. 8A and 8B are diagrams showing an encoder and a calibrator according to a fourth embodiment.
Figure 8B:
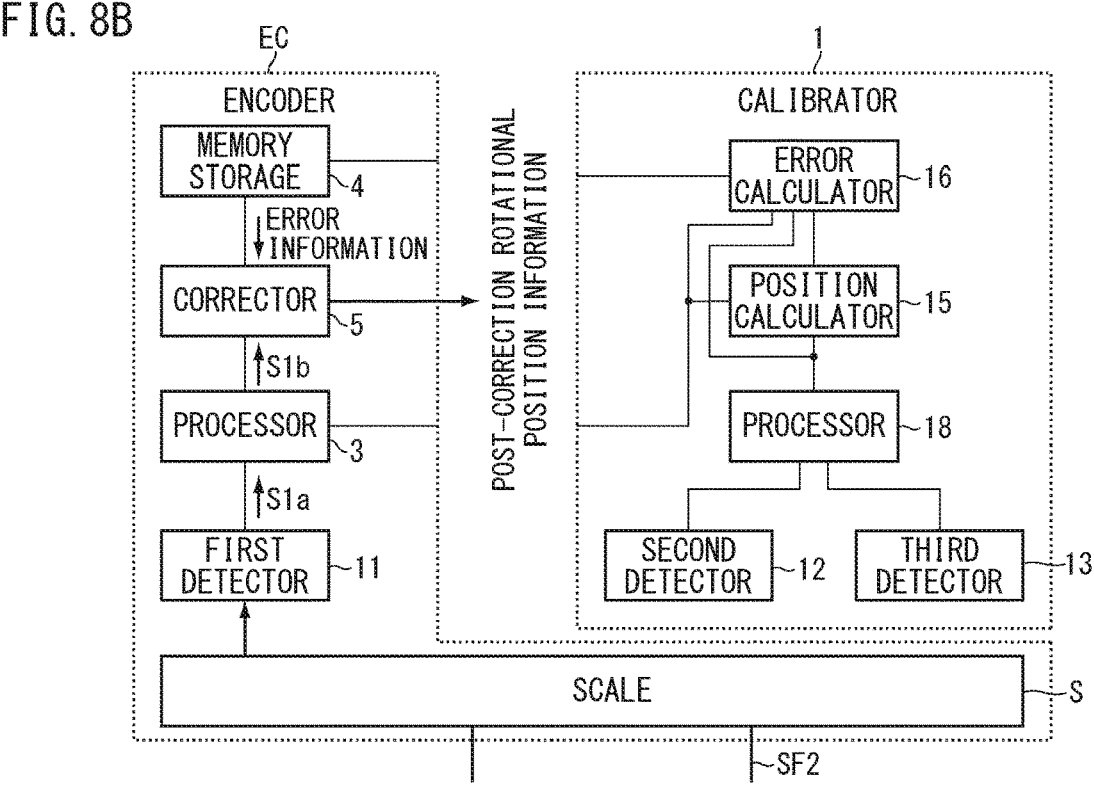

Next, a fourth embodiment will be described. In the present embodiment, the same reference signs are given to the same configurations as those in the embodiments described above, and the descriptions thereof will be omitted or simplified. FIGS. 8A and 8B are diagrams showing an encoder and a calibrator according to the fourth embodiment. In the present embodiment, the encoder EC includes the first detector 11, the processor 3, the memory storage 4, and the corrector 5. In the present embodiment, the calibrator 1 includes the second detector 12, the third detector 13, a processor 18, the position calculator 15, and the error calculator 16.

In FIG. 8A, the first detector 11 of the encoder EC detects the scale S. The first detector 11 outputs a detection signal S1a to the processor 3. The processor 3 calculates rotational position information S1b, on the basis of the detection signal S1a. The encoder EC (for example, the processor 3) outputs the calculated rotational position information S1b to the corrector 1.

The second detector 12 and the third detector 13 of the calibrator 1 each detect the scale S. The second detector 12 and the third detector 13 each detect the scale S in parallel with the detection process being performed by the first detector 11. The second detector 12 outputs a detection signal S2a to the processor 18. The processor 18 calculates rotational position information S2b, on the basis of the detection signal S2a. The third detector 13 outputs a detection signal S3a to the processor 18. The processor 18 calculates rotational position information S3b, on the basis of the detection signal S3a. The processor 18 outputs the rotational position information S2b and the rotational position information S3b to each of the position calculator 15 and the error calculator 16.

The position calculator 15 calculates a relative position between the first detector 11 and the second detector 12 (for example, φ1), using, as detection signals acquired from the first detector 11, the second detector 12, and the third detector 13, the rotational position information S1b, the rotational position information S2b, and the rotational position information S3b, respectively, the rotational position information S1b being output from the encoder EC (for example, the processor 3) and the rotational position information S2b and the rotational position information S3b being output from the processor 18 of the calibrator 1. The position calculator 15 may calculate a relative position between the first detector 11 and the third detector 13 (for example, φ2). The position calculator 15 outputs the calculated relative position to the error calculator 16.

The error calculator 16 calculates first error information, on the basis of the rotational position information S1b output from the encoder EC (for example, the processor 3), the rotational position information S2b calculated by the processor 18, and the relative position (for example, φ1) calculated by the position calculator 15. The error calculator 16 calculates second error information, on the basis of the rotational position information S1b, the rotational position information S3b calculated by the processor 18, and the relative position (for example, φ2) calculated by the position calculator 15. The error calculator 16 calculates error information on the basis of the first error information and the second error information. The error calculator 16 may calculate the first error information as the error information and may not calculate the second error information. The calibrator 1 stores the error information calculated by the error calculator 16 into the memory storage 4 of the encoder EC.

The encoder EC is removed from the calibrator 1 as shown in FIG. 8B after the memory storage 4 has stored the error information. In FIG. 8B, the first detector 11 detects the scale S attached to the rotating body SF2 (the second rotating body). The first detector 11 outputs a detection signal S1a to the processor 3. The processor 3 calculates rotational position information S1b, on the basis of the detection signal S1a. The processor 3 outputs the calculated rotational position information S1b to the corrector 5. The corrector 5 reads the error information from the memory storage 4 and corrects the rotational position information S1*b* on the basis of the error information. The encoder EC outputs the corrected rotational position information to the outside.

In the encoder EC according to the present embodiment, for example, the connection between the processor 3 and the second detector 12 and the connection between the processor 3 and the third detector 13 may be omitted. In the encoder EC according to the present embodiment, for example, the process of inputting the detection signal S2*a* to the processor 3, the process of inputting the detection signal S3*a* to the processor 3, the process of outputting the rotational position information S2*b* from the processor 3, and the process of outputting the rotational position information S3*b* from the processor 3 may be omitted to simplify the processing of the processor 3.

Fifth Embodiment

Figure 9A:
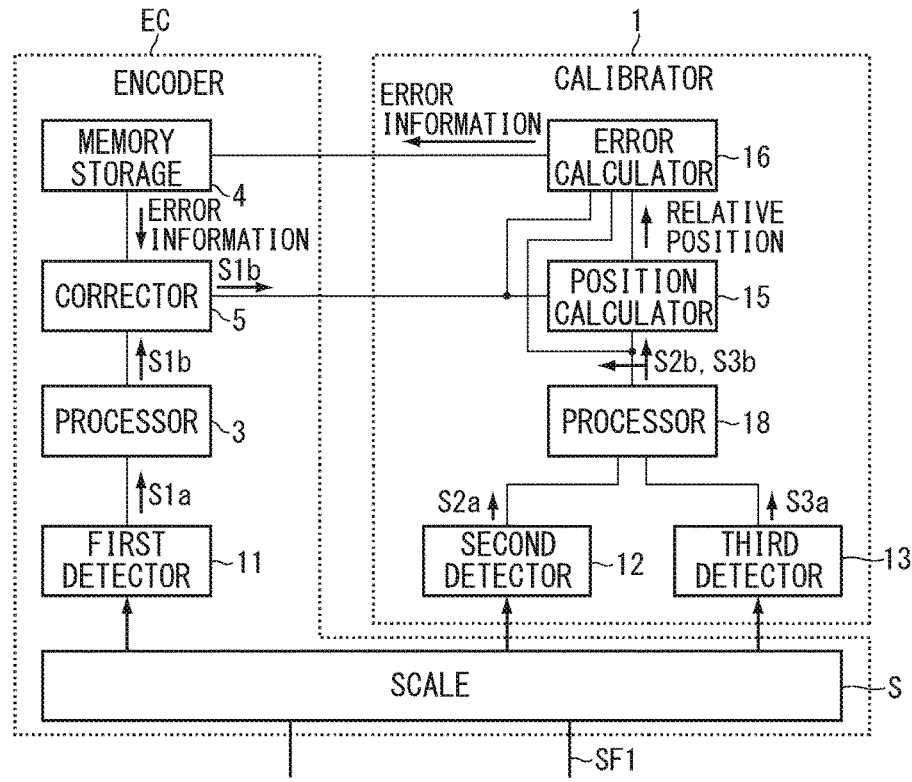
FIGS. 9A and 9B are diagrams showing an encoder and a calibrator according to a fifth embodiment.
Figure 9B:
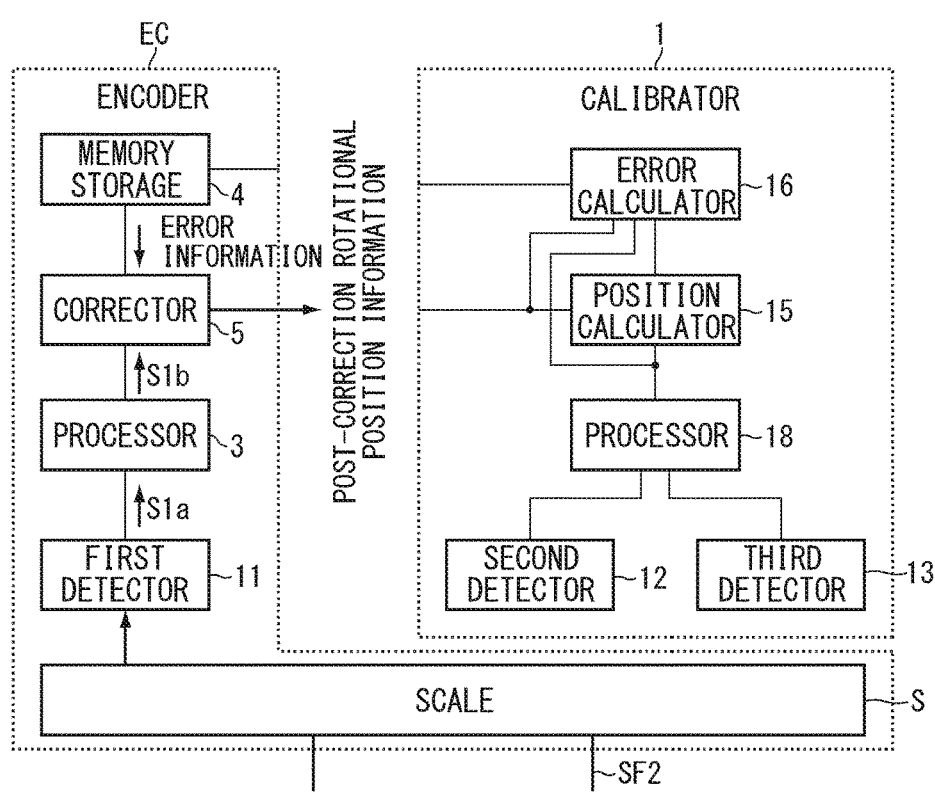

Hereunder, a fifth embodiment will be described. In the present embodiment, the same reference signs are given to the same configurations as those in the embodiments described above, and the descriptions thereof will be omitted or simplified. FIGS. 9A and 9B are diagrams showing an encoder and a calibrator according to the fifth embodiment. In the present embodiment, the calibrator 1 calculates error information on the basis of information output from the corrector 5 of the encoder EC. The encoder EC updates error information stored in the memory storage 4 to the error information calculated by the calibrator 1. Here, in FIG. 9A, initial error information is stored in the memory storage 4. The initial error information is error information according to which the correction amount is 0, for example.

In FIG. 9A, the first detector 11 of the encoder EC detects the scale S attached to the rotating body SF1. The first detector 11 outputs a detection signal S1*a* to the processor 3. The processor 3 calculates rotational position information S1*b* on the basis of the detection signal S1*a*. The processor 3 outputs the calculated rotational position information S1*b* to the corrector 5. The corrector 5 corrects the rotational position information S1*b* on the basis of the error information stored in the memory storage 4. The corrector 5 outputs the post-correction rotational position information. When the correction amount according to the error information stored in the memory storage 4 equals to 0, the post-correction rotational position information is the same as the rotational position information S1*b* before the correction.

The second detector 12 and the third detector 13 of the calibrator 1 each detect the scale S attached to the rotating body SF1. The second detector 12 outputs a detection signal S2*a* to the processor 18. The processor 18 calculates rotational position information S2*b*, on the basis of the detection signal S2*a*. The third detector 13 outputs a detection signal S3*a* to the processor 18. The processor 18 calculates rotational position information S3*b*, on the basis of the detection signal S3*a*. The processor 18 outputs the rotational position information S2*b* and the rotational position information S3*b* to each of the position calculator 15 and the error calculator 16.

The position calculator 15 calculates a relative position between the first detector 11 and the second detector 12 (for example, φ1), using, as detection signals acquired respectively from the first detector 11, the second detector 12, and the third detector 13, the post-correction rotational position information (for example, the rotational position information S1*b*), the rotational position information S2*b*, and the rotational position information S3*b*, respectively, the post-correction rotational position information being output from the encoder EC (for example, the corrector 5) and the rotational position information S2*b* and the rotational position information S3*b* being output from the processor 18. The position calculator 15 may calculate a relative position between the first detector 11 and the third detector 13 (for example, φ2). The position calculator 15 outputs the calculated relative position to the error calculator 16.

The error calculator 16 calculates first error information, on the basis of the rotational position information S1*b* output from the encoder EC (for example, the processor 3), the rotational position information S2*b* calculated by the processor 18, and the relative position (for example, φ1) calculated by the position calculator 15. The error calculator 16 calculates second error information, on the basis of the rotational position information S1*b*, the rotational position information S3*b* calculated by the processor 18, and the relative position (for example, φ2) calculated by the position calculator 15. The error calculator 16 calculates error information on the basis of the first error information and the second error information. The error calculator 16 may calculate the first error information as the error information and may not calculate the second error information. The calibrator 1 outputs the error information calculated by the error calculator 16 to the encoder EC. The encoder EC updates the error information stored in the memory storage 4 to the error information calculated by the error calculator 16.

The encoder EC is removed from the calibrator 1 as shown in FIG. 9B after the error information has been updated. In FIG. 9B, the first detector 11 detects the scale S. The first detector 11 outputs a detection signal S1*a* to the processor 3. The processor 3 calculates rotational position information S1*b*, on the basis of the detection signal S1*a*. The processor 3 outputs the calculated rotational position information S1*b* to the corrector 5. The corrector 5 reads the updated error information from the memory storage 4 and corrects the rotational position information S1*b* on the basis of the error information. The encoder EC outputs the post-correction rotational position information to the outside.

In the encoder EC according to the present embodiment, the processing of the corrector 5 is similar between FIG. 9A and FIG. 9B, and the processing related to signal input and signal output in the corrector 5 is simplified. For example, the encoder EC can use an output system which outputs post-correction rotational position information to the controller MC shown in FIG. 2 (for example, an external output terminal) as an output system which outputs the rotational position information S1*b* to the calibrator 1, thereby preventing the configuration of the encoder EC from becoming complex.

The memory storage 4 in FIG. 9A may store the error information calculated in the previous calibration process by the calibrator 1. The encoder EC may update the error information stored in the memory storage 4 to the error information calculated in the current calibration process by the calibrator 1.

Sixth Embodiment

Figure 10A:
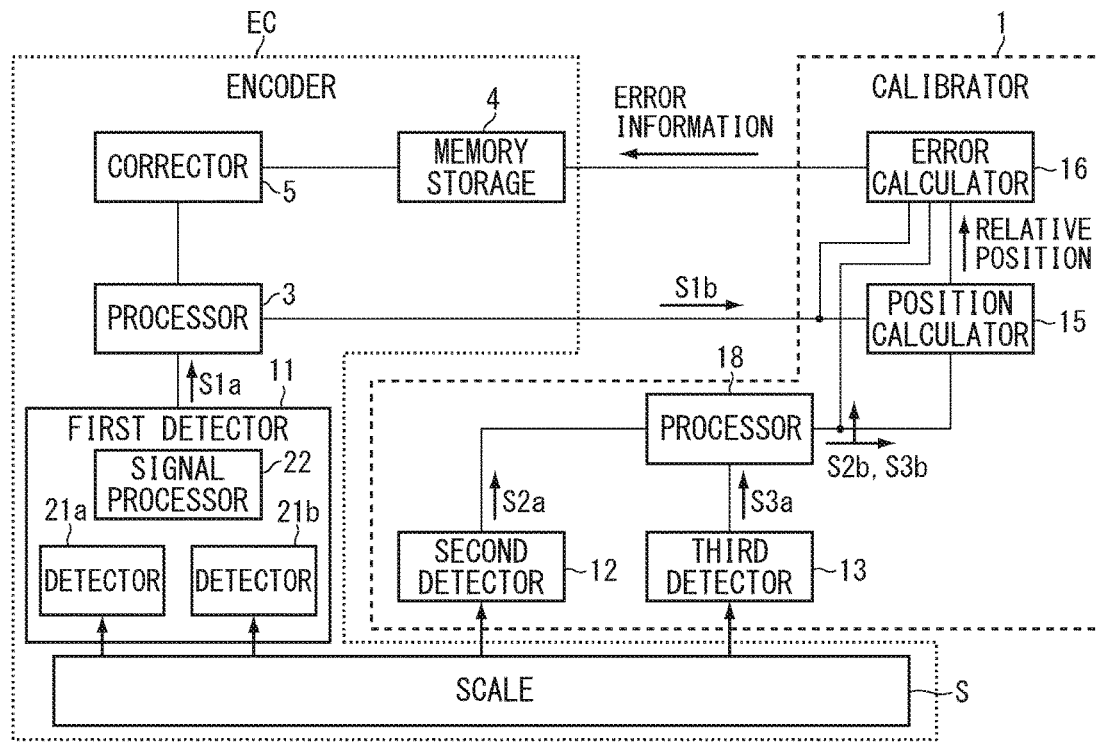
FIGS. 10A and 10B are diagrams showing an encoder and a calibrator according to a sixth embodiment.
Figure 10B:
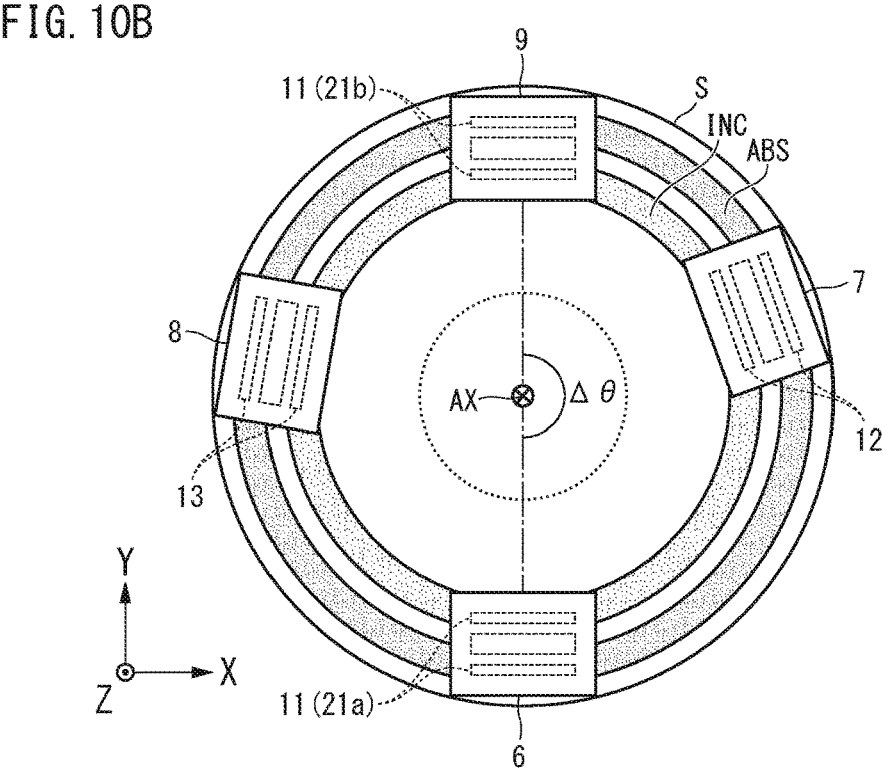

Hereunder, a sixth embodiment will be described. In the present embodiment, the same reference signs are given to the same configurations as those in the embodiments described above, and the descriptions thereof will be omitted or simplified. FIGS. 10A and 10B are diagrams showing an encoder and a calibrator according to the sixth embodiment. In the present embodiment, the first detector 11 includes a plurality of detection units (a detection unit 21*a* and a detection unit 21*b*). One or both of the position calculator 15 and the error calculator 16 use a signal resulting from averaging signals acquired from the plurality of detection units (the detection unit 21*a* and the detection unit 21*b*) as a detection signal of the first detector 11.

FIG. 10B is a diagram showing a scale and detection heads according to the present embodiment. A first head 6 and a fourth head 9 are provided in the encoder EC. The detection unit 21*a* is provided in the first head 6. The detection unit 21*b* is provided in the fourth head 9. The fourth head 9 is of a configuration similar to that of the first head 6. The detection unit 21*a* and the detection unit 21*b* each detect both the incremental pattern INC and the absolute pattern ABS of the scale S.

Here, the number of detection units (for example, the detection unit 21*a* and the detection unit 21*b*) included in the first detector 11 (see FIG. 10A) is defined as Sk (for example, 2). An angle $\Delta\theta$ between the detection position of the first head 6 and the detection position of the fourth head 9 about the rotation axis AX (difference in angular position) is set to, for example, $2\pi/Sj$ [rad]. For example, in FIG. 10A, Sj is 2, and $\Delta\theta$ is set to $\pi$ [rad] (180°).

The first detector 11 of FIG. 10A includes a signal processor 22. The detection unit 21*a* and the detection unit 21*b* each output detection a signal corresponding to the detection result of detecting the scale S to the signal processor 22. The signal processor 22 averages the detection signal from the detection unit 21*a* and the detection signal from the detection unit 21*b*. The signal processor 22 outputs the averaged signal as a detection signal S1*a* of the first detector 11. When rotational position information acquired from the detection signal S1*a* is expressed in terms of a Fourier series, odd order errors are canceled out. Therefore, the error calculator 16 according to the present embodiment calculates error information for even order components when the rotational position information acquired from the detection signal S1*a* is expressed in terms of the Fourier series.

Seventh Embodiment

Figure 11A:
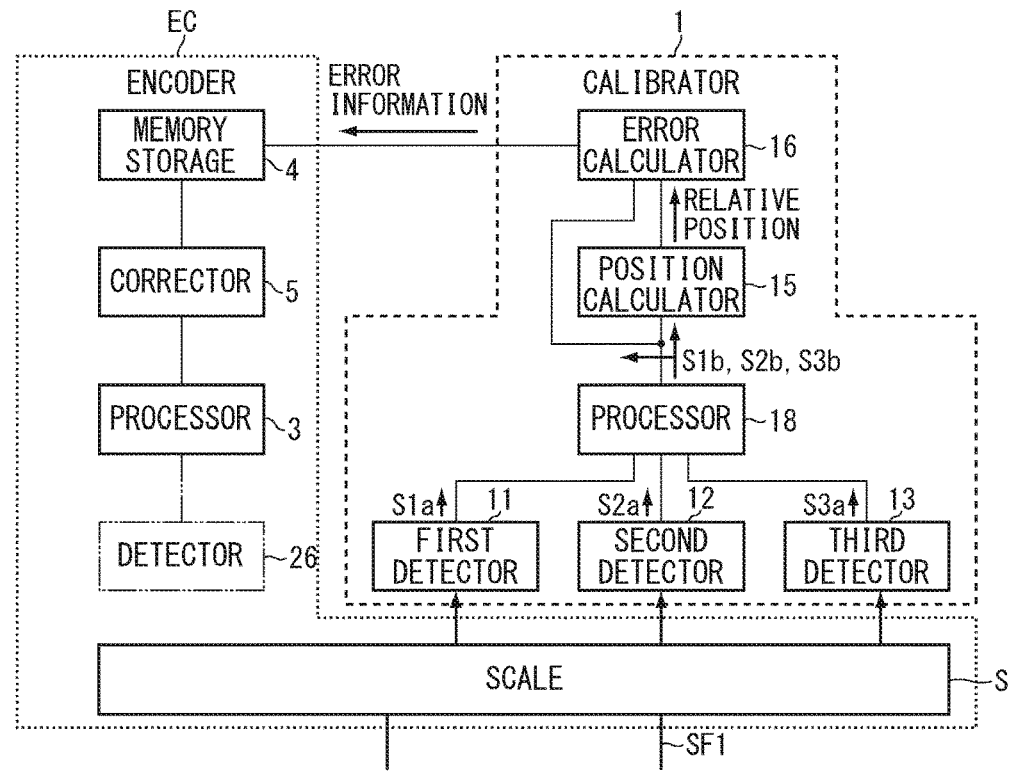
FIGS. 11A and 11B are diagrams showing an encoder and a calibrator according to a seventh embodiment.
Figure 11B:
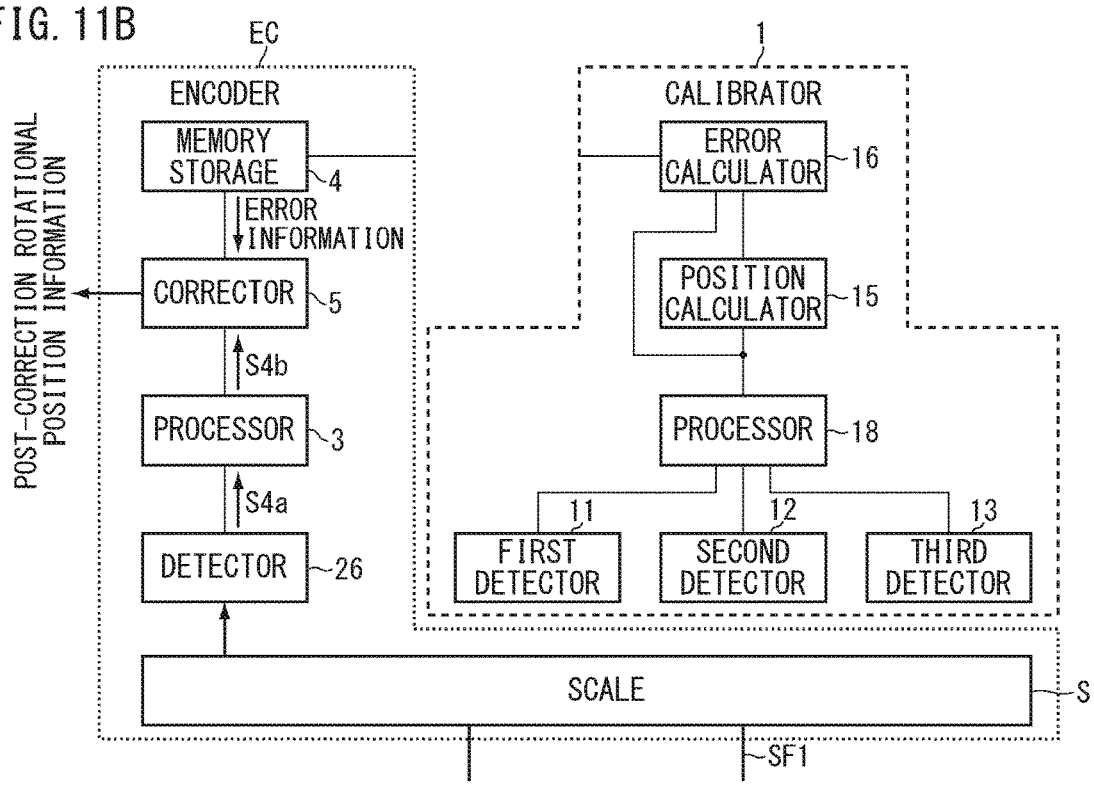

Next, a seventh embodiment will be described. In the present embodiment, the same reference signs are given to the same configurations as those in the embodiments described above, and the descriptions thereof will be omitted or simplified. FIGS. 11A and 11B are diagrams showing an encoder and a calibrator according to the seventh embodiment. FIG. 11A shows the encoder EC and the calibrator 1 in the calibration process. In the present embodiment, the calibrator 1 includes the detection system 2. The detection system 2 includes the first detector 11, the second detector 12, and the third detector 13.

The position calculator 15 calculates a relative position between the first detector 11 and the second detector 12 on the basis of detection signals acquired respectively from the first detector 11, the second detector 12, and the third detector 13 (for example, rotational position information S1*b*, rotational position information S2*b*, and rotational position information S3*b*). The error calculator 16 calculates error information on the basis of the relative position calculated by the position calculator 15 and the detection signals acquired from the detection system 2 (for example, the rotational position information S1*b* and the rotational position information S2*b*). The calibrator 1 outputs the error information calculated by the error calculator 16 to the encoder EC. The memory storage 4 of the encoder EC stores the error information output from the calibrator 1. The encoder EC is removed from the calibrator 1 after the memory storage 4 has stored the error information (for example, upon completion of the calibration process).

FIG. 11B shows the encoder EC and the calibrator 1 after the calibration process. In FIG. 11B, the encoder EC includes the scale S, the memory storage 4, the corrector 5, and a detector 26. The scale S is attached to the rotating body SF2. The rotating body SF2 may be the same as the rotating body SF1 in FIG. 11A or may be different from the rotating body SF1.

The detector 26 (the fourth detector) is positioned with respect to the scale S. The detector 26 differs from any of the first detector 11, the second detector 12, and the third detector 13 shown in FIG. 11A. The detector 26 is attached, for example, to the encoder EC having been removed from the calibrator 1 (for example, the encoder EC after the calibration process). The detector 26 is positioned with respect to the scale S on the basis of the position of the first detector 11. The detector 26 is positioned so that the relative position between the detector 26 and the scale S is the same as the relative position between the first detector 11 and the scale S.

Figure 12A:
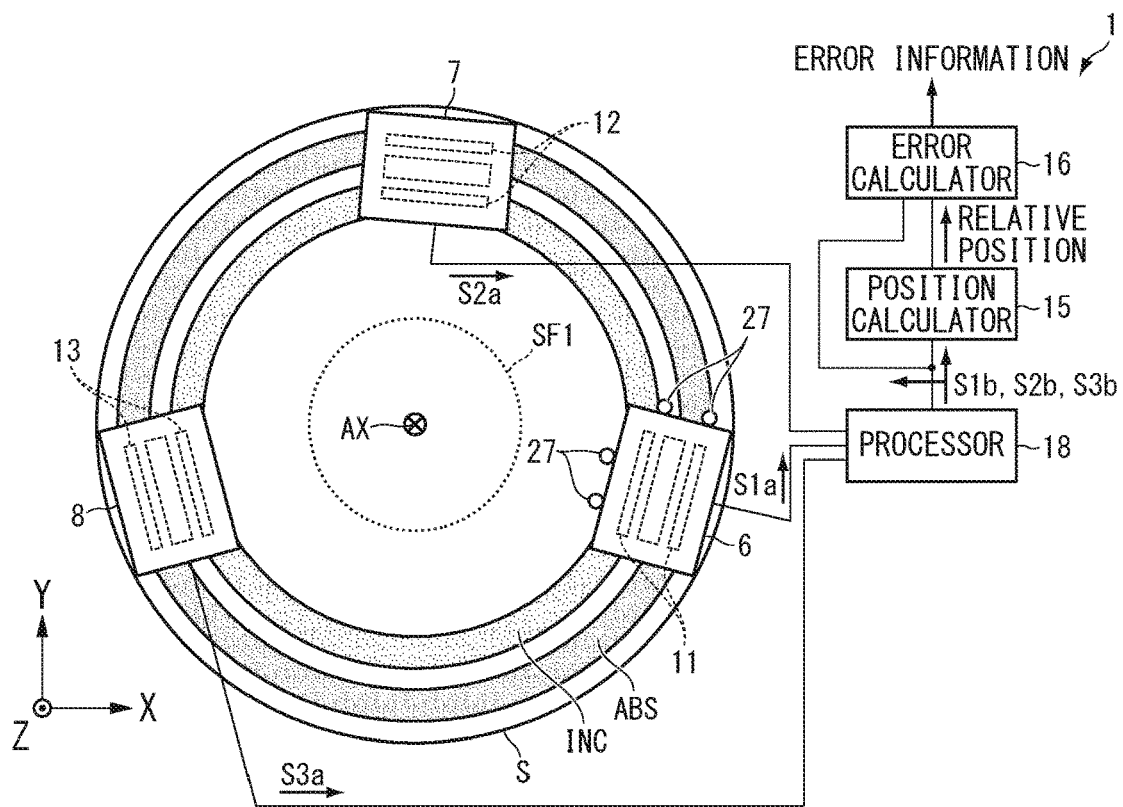
FIGS. 12A and 12B are diagrams showing an example of a method of arranging detectors according to the seventh embodiment.
Figure 12B:
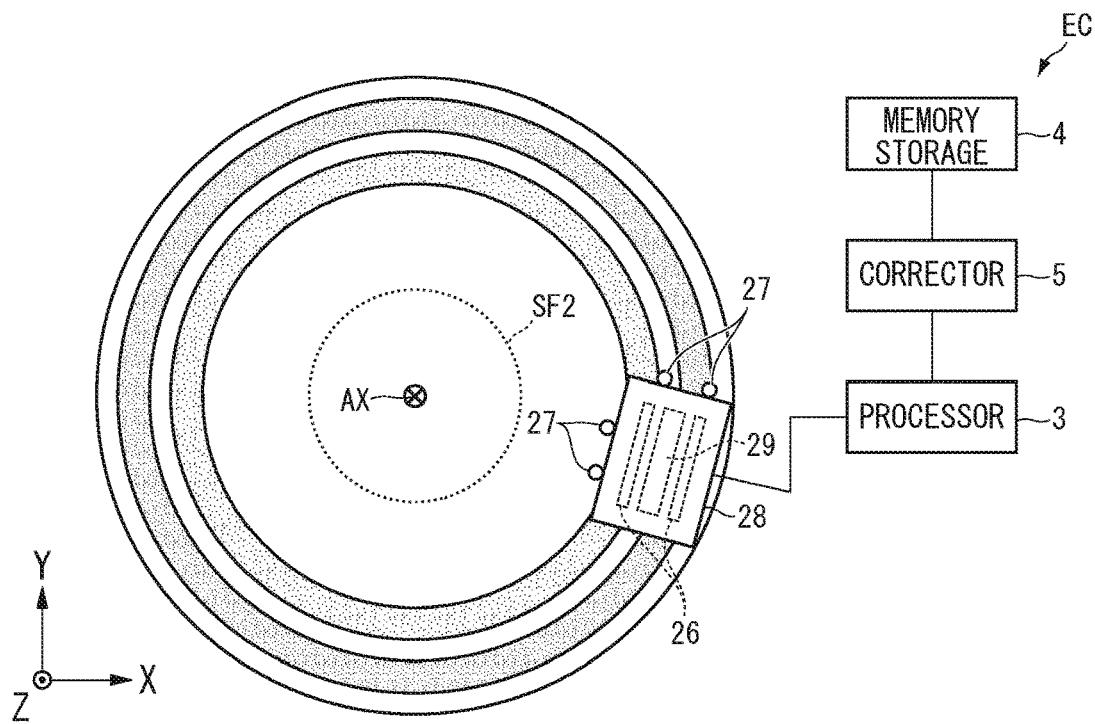

FIGS. 12A and 12B are diagrams showing an example of a method of arranging detectors of the encoder according to the seventh embodiment. FIG. 12A shows the calibrator 1 in the calibration process. The calibrator 1 includes the first head 6, the second head 7, and the third head 8. The first detector 11 is provided in the first head 6. The second detector 12 is provided in the second head 7. The third detector 13 is provided in the third head 8. The first head 6 is positioned by aligners 27. The aligners 27 include, for example, positioning pins. The first head 6 is positioned with respect to the scale S, for example, by being arranged so as to come in contact with the aligners 27. The first detector 11 is positioned with respect to the scale S as a result of the first head 6 having been positioned.

FIG. 12B is a diagram showing the encoder from which the calibrator 1 of FIG. 12A has been removed. The encoder EC includes a detection head 28. The detection head 28 is of a configuration similar to that of the first head 6 of FIG. 12A. The detection head 28 includes the detector 26 and an irradiator 29. The irradiator 29 irradiates both the incremental pattern INC and the absolute pattern ABS with light. The detector 26 detects light from both the incremental pattern INC and the absolute pattern ABS.

The detection head 28 is positioned by aligners 27 as with the first head 6 of FIG. 12A. The detection head 28 is positioned with respect to the scale S, for example, by being arranged so as to come in contact with the aligners 27. The detector 26 is positioned with respect to the scale S as a result of the detection head 28 having been positioned.

Returning to the description of FIG. 11B, the detector 26 detects the scale S attached to the rotating body SF2. The detector 26 outputs a detection signal S4*a* to the processor 3. The processor 3 calculates rotational position information S4*b* of the rotating body SF2, on the basis of the detection signal S4*a*. The processor 3 outputs the calculated rotational position information S4*b* to the corrector 5. The corrector 5 corrects the rotational position information S4*b* of the rotating body SF2 acquired from the detection result of the detector 26, on the basis of the error information stored in the memory storage 4. The encoder EC outputs the post-correction rotational position information to the outside.

Eighth Embodiment

Figure 13:
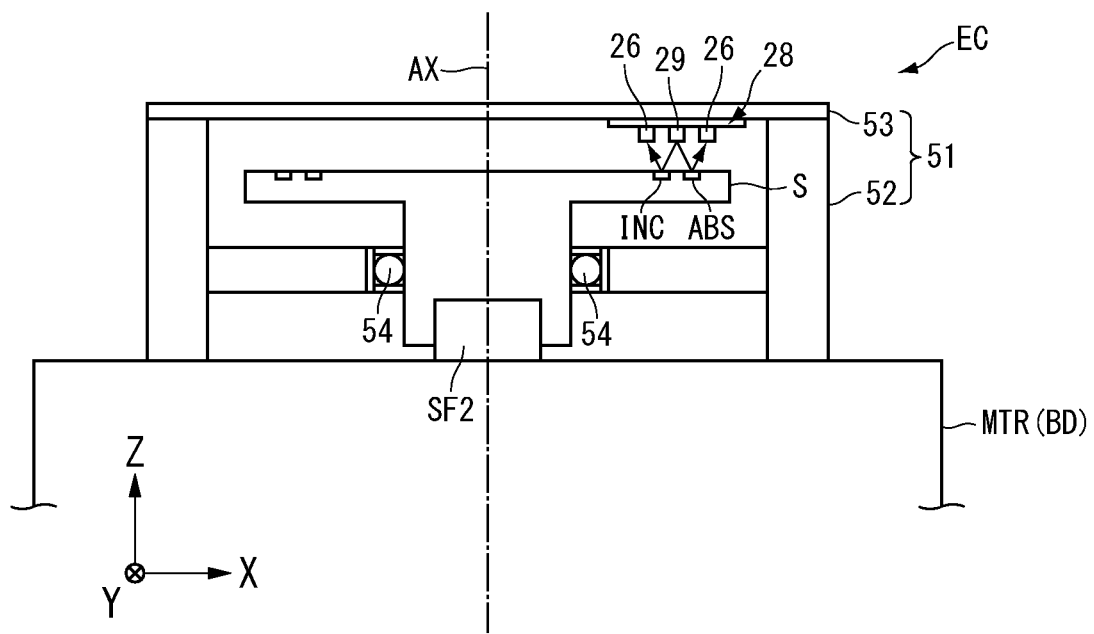
FIG. 13 is a diagram showing an encoder according to an eighth embodiment.

Next, an eighth embodiment will be described. In the present embodiment, the same reference signs are given to the same configurations as those in the embodiments described above, and the descriptions thereof will be omitted or simplified. FIG. 13 is a diagram showing an encoder according to the eighth embodiment. In the present embodiment, the encoder EC includes the scale S, the detector 26, the irradiator 29, the processor 3, the memory storage 4, the corrector 5, and an encoder main body 51.

The encoder main body 51 is fixed to a main body BD of the driving device MTR on which the encoder EC is mounted. The main body BD (the driver) accommodates a mover (for example, an armature) and a stator (for example, a permanent magnet) of the driving device MTR. The mover of the driving device MTR moves (for example, rotates) with respect to the stator. The rotating body SF2 is connected to the mover of the driving device MTR and moves (for example, rotates) together with the mover.

The encoder main body 51 includes a first supporter (a first supporting member) and a second supporter 53 (a second supporting member). The first supporter 52 is fixed to a member on the stator side in the driving device MTR (for example, the main body BD). The first supporter 52 includes, for example, a mold or a spacer. The first supporter 52 is, for example, a hollow member (for example, a cylindrical member). The first supporter 52 accommodates the scale S therein. The scale S is, for example, a flange-shaped member and is supported by the first supporter 52 via a bearing 54. The scale S is supported so as to be able to rotate with respect to the first supporter 52.

The second supporter 53 is arranged on the opposite side (the +Z side) of the driving device MTR to the first supporter 52. The second supporter 53 is fixed to the first supporter 52. The second supporter 53 is provided so as to close one opening of the cylindrical first supporter 52, for example. The scale S is arranged (accommodated) in a space surrounded by the main body BD of the driving device MTR, the first supporter 52, and the second supporter 53.

The second supporter 53 includes a treated substrate (for example, a printed substrate). A processing circuit, wiring, and terminals, for example, are formed on the second supporter 53. Electronic components including a processing circuit, for example, are mounted on the second supporter 53. The detection head 28 (the detector 26, the irradiator 29) is supported on a surface of the second supporter 53 facing the scale S. Each of the processor 3, the memory storage 4, and the corrector 5 shown in FIG. 11B is mounted on the second supporter 53.

The encoder EC is manufactured, for example, by assembling the scale S and the encoder main body 51. The scale S is, for example, supported on the encoder main body (for example, the first supporter 52) via the bearing 54, thereby being positioned in the directions perpendicular to the rotation axis AX (in the X direction and the Y direction) with respect to the detector 26.

Ninth Embodiment

Figure 14A:
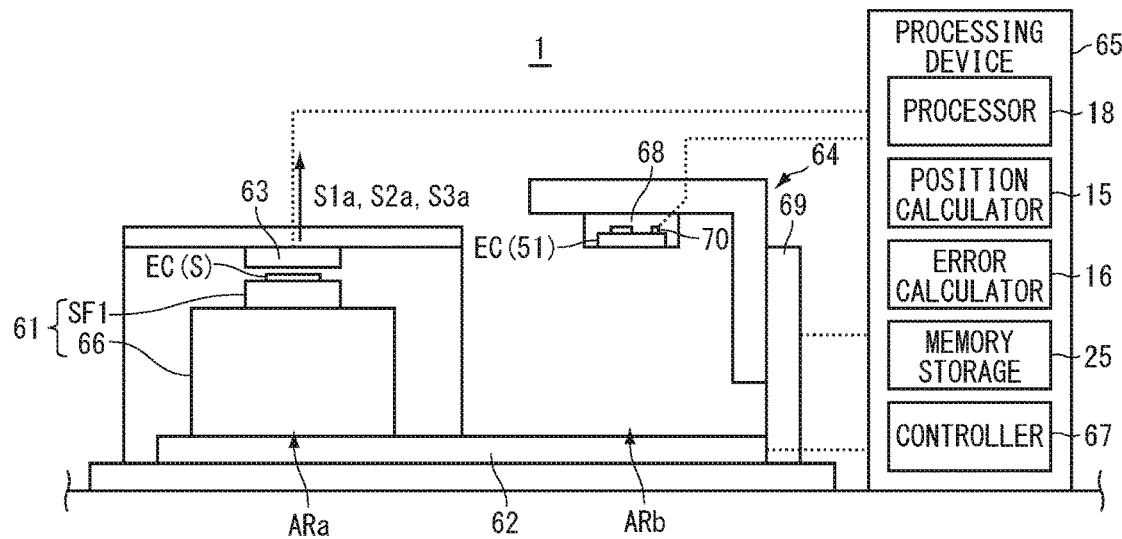
FIGS. 14A, 14B, and 14C are diagrams showing a calibrator according to a ninth embodiment.
Figure 14B:
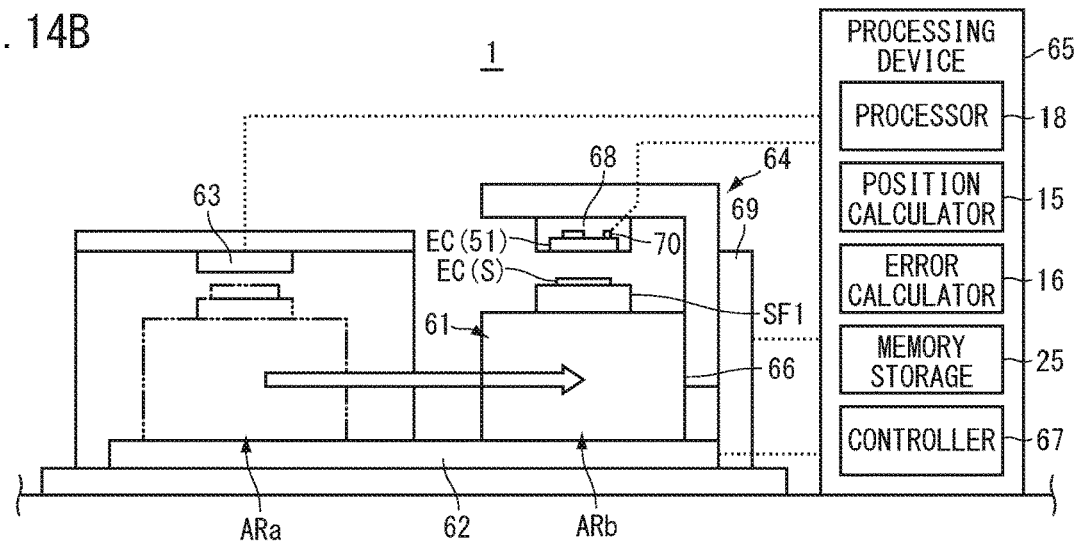
Figure 14C:
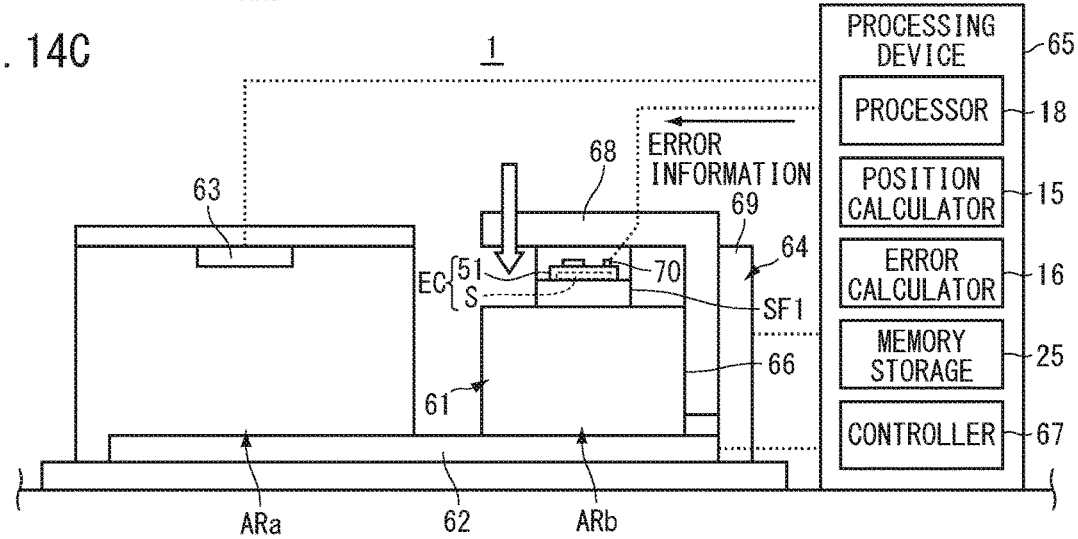

Next, a ninth embodiment will be described. In the present embodiment, the same reference signs are given to the same configurations as those in the embodiments described above, and the descriptions thereof will be omitted or simplified. FIGS. 14A, 14B, and 14C are diagrams showing a calibrator according to the ninth embodiment. The calibrator 1 (for example, a calibration system, manufacturing device) includes a driving device 61, a moving device 62, a detection device 63, an alignment device 64, and a processing device 65.

In the state of FIG. 14A, the driving device 61 and the detection device 63 are arranged in a measurement area ARa. The driving device 61 includes the rotating body SF1 and a driver 66. The scale S of the encoder EC is attached to the rotating body SF1. The driver 66 includes, for example, an electric motor and causes the rotating body SF1 to rotate. The detection device 63 includes the first head 6, the second head 7, and the third head 8 shown in FIG. 12A. The detection device 63 is arranged at a position at which it faces the scale S attached to the rotating body SF1. The detection device 63 detects the scale S and outputs a detection signal S1a, a detection signal S2a, and a detection signal S3a to the processing device 65.

The processing device 65 includes the position calculator 15, the error calculator 16, the processor 18, the memory storage 25, and a controller 67. The position calculator 15, the error calculator 16, and the processor 18 are each similar to those in FIG. 11A. The processor 18 calculates rotational position information (for example, the rotational position information S1b, the rotational position information S2b, and the rotational position information S3b of FIG. 11A) for each of the detection signal S1a, the detection signal S2a, and the detection signal S3a output from the detection device 63.

The position calculator 15 calculates a relative position between the first detector 11 (see FIG. 12A) and the second detector 12 (see FIG. 12A) on the basis of detection signals acquired from the detection device 63 (the detectors). The position calculator 15 uses, as the detection signals acquired from the detection device 63 (the detectors), the rotational position information calculated by the processor 18. The error calculator 16 calculates error information on the basis of the detection signals acquired from the detection device 63 (the detection system 2) and the relative position calculated by the position calculator 15. The error calculator 16 uses, as the detection signals acquired from the detection device 63 (the detectors), the rotational position information calculated by the processor 18. The error calculator 16 stores the calculated error information into the memory storage 25.

The moving device 62 moves the driving device 61 between the measurement area ARa and an assembly area ARb. After the detection device 63 has completed the process of detecting the scale S, the moving device 62 moves the driving device 61 with the scale S attached thereto from the measurement area ARa to the assembly area ARb, as shown in FIG. 14B. The alignment device 64 is arranged in the assembly area ARb. The alignment device 64 includes a holder 68 and a moving unit 69. The holder 68 holds the encoder main body 51 (see FIG. 13).

As with FIG. 11B, the encoder main body 51 supports the processor 3, the memory storage 4, the corrector 5, and the detector 26. The holder 68 holds the encoder main body 51 in a position at which it faces the scale S attached to the rotating body SF1 of the driving device 61. The moving unit 69 brings the holder 68 holding the encoder main body 51 and the scale S attached to the rotating body SF1 close to each other and positions the scale S and the encoder main body 51 of the encoder EC. For example, the scale S is arranged below the encoder main body 51, and the moving unit 69 lowers the holder 68 holding the encoder main body 51.

The scale S and the encoder main body 51 are assembled in the assembly area ARb. The scale S is attached to the encoder main body 51 via the bearing 54 shown in FIG. 13, for example, while being positioned with respect to the encoder main body 51. The alignment device 64 may execute at least a part of the process of assembling the scale S and the encoder main body 51. The encoder EC is assembled (manufactured) by attaching the scale S to the encoder main body 51.

As shown in FIG. 14C, the processing device 65 is communicably connected to the encoder main body 51 via a contact probe 70 (for example, an external connection terminal). The processing device 65 outputs error information stored in the memory storage 25 to the encoder main body 51 via the contact probe 70. The memory storage 4 shown in FIG. 11B acquires the error information via the contact probe 70 and stores the error information.

The controller 67 of the processing device 65 controls each part of the calibrator 1. The controller 67 controls the driving device 61 in the state of FIG. 14A, causing the rotating body SF1 with the scale S attached thereto to rotate. The controller 67 controls the detection device 63, causing it to execute the process of detecting the scale S rotating together with the rotating body SF1. The controller 67 causes the detection device 63 to output each of a detection signal S1$a$, a detection signal S2$a$, and a detection signal S3$ay$. The controller 67 causes the position calculator 15 to execute the relative position calculation process. The controller 67 causes the error calculator 16 to execute the error information calculation process.

The controller 67 controls the moving device 62 to move the driving device 61 to the assembly area ARb after the detection device 63 has completed the process of detecting the scale S. The controller 67 controls the alignment device 64 to assemble the encoder EC in the assembly area ARb for example. The controller 67 stores the error information stored in the memory storage 25 into the memory storage 4 of the encoder EC (see FIG. 11B). The controller 67 may be provided in a separate device from the processing device 65 (for example, a control device). The controller 67 may not execute at least a part of the control described above. For example, at least a part of the control described above may be executed by an operator.

Tenth Embodiment

Figure 15:
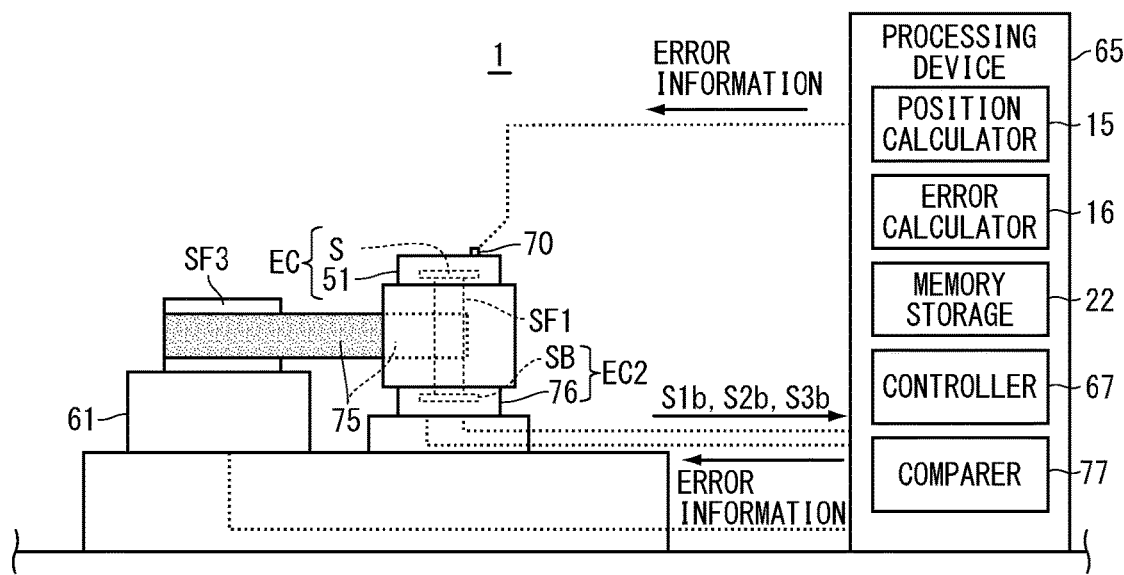
FIG. 15 is a diagram showing a calibrator according to a tenth embodiment.

Next, a tenth embodiment will be described. In the present embodiment, the same reference signs are given to the same configurations as those in the embodiments described above, and the descriptions thereof will be omitted or simplified. FIG. 15 is a diagram showing a calibrator according to the tenth embodiment. The calibrator 1 includes the driving device 61, the rotating body SF1, an encoder EC2, and the processing device 65. The calibrator 1 executes the calibration process for the encoder EC2. The calibrator 1 generates error information on the encoder EC on the basis of the rotational position information of the rotating body SF1 detected by the calibrated encoder EC2 and the rotational position information of the rotating body SF1 detected by a calibration target encoder EC.

The rotating body SF1 of the calibrator 1 is connected to the driving device 61 via a power transmitter 75. The power transmitter 75 is, for example, a belt or the like and is stretched between the rotating body SF1 and a rotating body SF3 of the driving device 61. The driving device 61 causes the rotating body SF3 to thereby supply a driving force (a rotational force) to the rotating body SF1 via the power transmitter 75 and rotates the rotating body SF1.

The calibration target encoder EC is of a configuration similar to that in FIG. 11B. The encoder EC includes the scale S and the encoder main body 51. The scale S is attached to the rotating body SF1. For example, the scale S is attached to an end part of the rotating body SF1. The encoder EC outputs to the processing device 65 detection signals acquired upon detecting the scale S attached to the rotating body SF1.

The encoder EC2 is provided separately from the calibration target encoder EC. The encoder EC2 includes a scale SB and an encoder main body 76. The scale SB is attached to the same rotating body SF1 to which the scale S of the calibration target encoder EC is attached. For example, the scale SB is attached to an end part of the rotating body SF1 on the opposite side of the scale S. The angle of rotation that the scale SB makes when the rotating body SF1 rotates is the same as the angle of rotation that the scale S makes.

The first head 6, the second head 7, and the third head 8 shown in FIGS. 12A and 12B are provided in the encoder main body 76. The encoder main body 76 outputs detection signals acquired upon the first head 6, the second head 7, and the third head 8 shown in FIGS. 12A and 12B detecting the scale SB. The encoder main body 76 outputs, as the detection signals acquired upon detecting the scale SB, for example, the calculated rotational position information S1$b$, the rotational position information S2$b$, and the rotational position information S3$b$ shown in FIG. 11A to the processing device 65.

The processing device 65 includes the position calculator 15, the error calculator 16, the memory storage 25, the controller 67, and a comparer 77. The position calculator 15 calculates a relative position between the first head 6 and the second head 7 shown in FIGS. 12A and 12B on the basis of the detection signal output from the encoder EC2. The error calculator 16 calculates error information on the encoder EC on the basis of the relative position calculated by the position calculator 15. The processing device 65 outputs the error information calculated by the error calculator 16 to the encoder main body 76. The encoder EC2 corrects rotational position information on the basis of the error information. The encoder EC2 can output post-correction rotational position information to the processing device 65.

The comparer 77 compares the rotational position information output from the encoder EC with the post-correction rotational position information output from the encoder EC2. The comparer 77 calculates (generates) error information on the encoder EC, taking the rotational position information output from the encoder EC as a read value and the post-correction rotational position information output from the encoder EC2 as a calibration value, for example. For example, the comparer 77 generates, as error information on the encoder EC, information in which the rotational position information output from the encoder EC (read value) and the post-correction rotational position information output from the encoder EC2 (calibration value) are paired. A memory storage 25 stores the error information on the encoder EC.

The processing device 65 outputs the error information calculated by the comparer 77 to the encoder EC. The encoder EC stores the error information output from the processing device 65 into the memory storage 4 (see FIG. 11B). The corrector 5 of the encoder EC (see FIG. 11B) corrects the rotational position information acquired from the detection result of the detector 26, on the basis of the error information stored in the memory storage 4. The encoder EC outputs the post-correction rotational position information to an external device.

Driving Device

Figure 16:
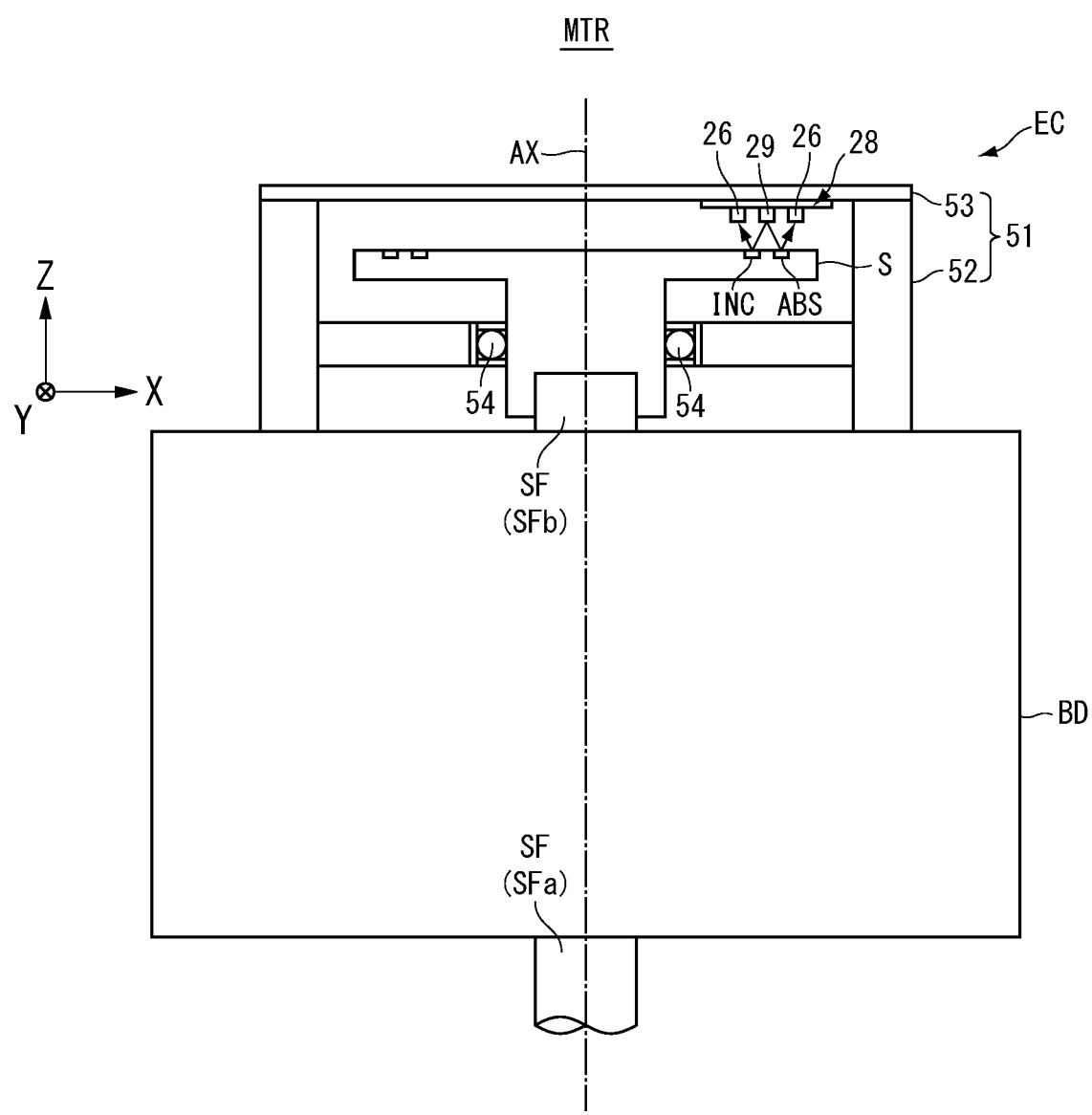
FIG. 16 is a diagram showing a driving device according to the embodiment.

Next, a driving device according to the embodiment will be described. FIG. 16 is a diagram showing the driving device according to the embodiment. In the following description, the same or similar members as or to those in the above embodiments are assigned with the same signs and the descriptions thereof are omitted or simplified. The driving device MTR is a motor device including an electric motor. The driving device MTR includes a rotating body SF, the main body BD, and the encoder EC. The rotating body SF is, for example, the rotating body SF1 shown in FIG. 1 or the rotating body SF2 shown in FIG. 2.

The rotating body SF has a load-side end SFa and a non-load-side end SFb. The load-side end SFa is connected to another power transmission mechanism such as a speed reducer. The scale S is fixed to the non-load-side end SFb via a fixing part. The main body BD drives the rotating body SF to rotate. The encoder EC is attached to the main body BD as the scale S is fixed. The encoder EC is an encoder according to the embodiments or a combination thereof.

The driving device MTR controls the main body BD using the detection result of the encoder EC. Since the encoder EC outputs post-correction rotational position information, the driving device MTR can highly accurately control rotation of the rotating body SF. The driving device MTR is not limited to a motor device and may be another driving device having a shaft which rotates with use of hydraulic pressure or pneumatic pressure.

Stage Device

Figure 17:
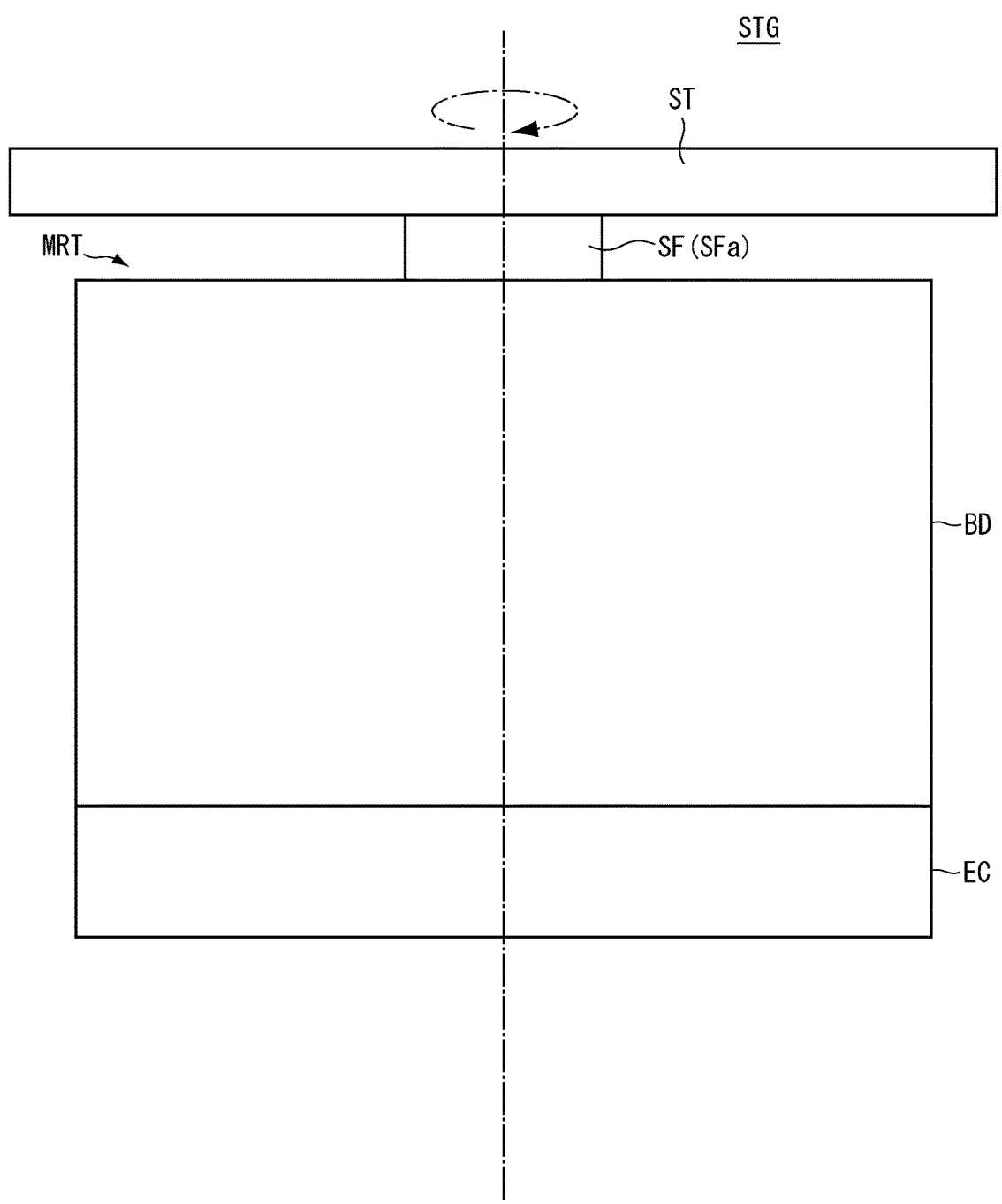
FIG. 17 is a diagram showing a stage device according to the embodiment.

Next, a stage device according to the embodiment will be described. In the following description, the same or similar members as or to those in the above embodiments are assigned with the same signs and the descriptions thereof are omitted or simplified. FIG. 17 is a diagram showing the stage device according to the embodiment. A stage device STG is of a configuration in which a stage (a rotary table ST, a moving object) is attached to the load-side end SFa of the rotating body SF of the driving device MTR shown in FIG. 17.

The stage device STG drives the driving device MTR to rotate the rotating body SF. The rotation is transmitted to the rotary table ST, and the encoder EC detects rotational position information of the rotating body SF. In the stage device STG, the position of the rotary table ST is controlled using the output from the encoder EC. In the stage device STG, since the encoder EC outputs post-correction rotational position information, the position of the rotary table ST can be highly accurately controlled.

A speed reducer or the like may be arranged between the load-side end SFa of the driving device MTR and the rotary table ST. The stage device STG can also be applied to, for example, a rotary table provided in a machine tool such as a lathe. The stage device STG may be a device (for example, an X stage, an XY stage, an XYZ stage) which converts the rotational motion of the rotating body SF into a linear motion and moves the stage.

Robot

Figure 18:
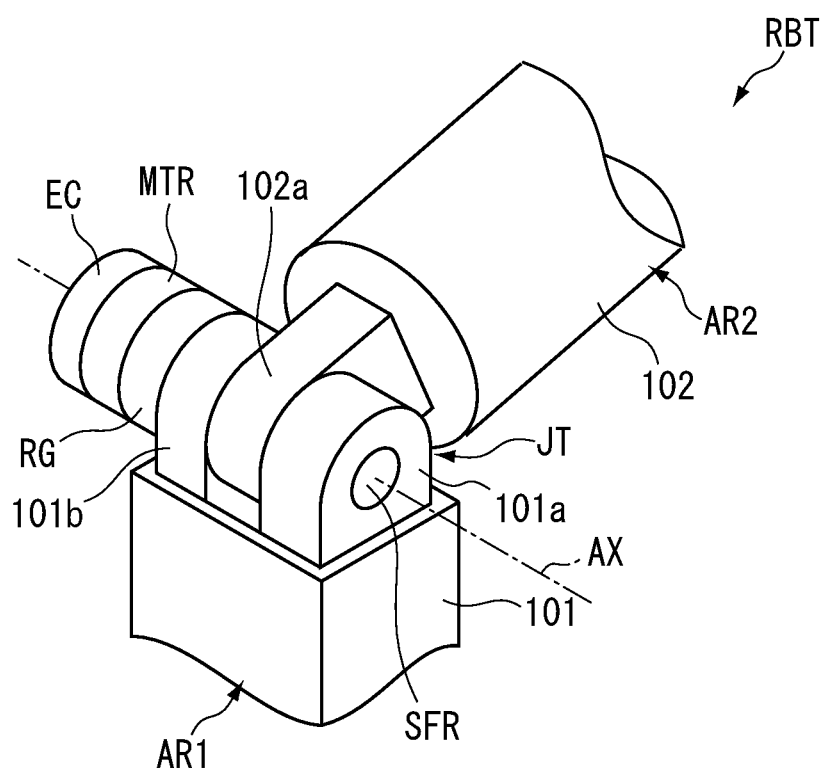
FIG. 18 is a diagram showing a robot according to the embodiment.

Next, a robot according to the embodiment will be described. FIG. 18 is a diagram showing a robot according to the embodiment. FIG. 18 shows a part (a joint portion) of a robot RBT. In the following description, the same or similar members as or to those in the above embodiments are assigned with the same signs and the descriptions thereof are omitted or simplified. The robot RBT has a first arm AR1, a second arm AR2, and a joint JT. The first arm AR1 is connected to the second arm AR2 via the joint JT.

The first arm AR1 includes an arm part 101, a bearing 101a, and a bearing 101b. The second arm AR2 has an arm part 102 and a connector 102a. The connector 102a is arranged between the bearing 101a and the bearing 101b in the joint JT. The connector 102a is provided integrally with a rotating body SFR. The rotating body SFR is inserted into both the bearing 101a and the bearing 101b in the joint JT. An end of the rotating body SFR on the side inserted into the bearing 101b penetrates the bearing 101b and is connected to a speed reducer RG.

The speed reducer RG is connected to the driving device MTR. The speed reducer RG transmits the rotation of the driving device MTR to the rotating body SFR at a speed reduced at a predetermined speed change ratio. The load-side end of the rotating body of the driving device MTR is connected to the speed reducer RG. The scale of the encoder EC is attached to the non-load-side end of the rotating body of the driving device MTR.

In the robot RBT, when the driving device MTR is driven to cause the rotating body to rotate, the rotation is transmitted to the rotating body SFR via the speed reducer RG. The rotation of the rotating body SFR causes the connector 102a to rotate integrally therewith, and the second arm AR2 rotates with respect to the first arm AR1. At this time, the encoder EC detects rotational position information of the rotating body of the driving device MTR. In the robot RBT, the rotational position information output from the encoder EC is used to control the position of the second arm AR2. In the robot RBT, since the encoder EC outputs post-correction rotational position information, the position of the second arm AR2 can be highly accurately controlled. The robot RBT is not limited to the above configuration, and the driving device MTR can be applied to various types of robots having a joint.

In the embodiments described above, the calibrator 1 includes, for example, a computer system. The calibrator 1 reads a calibration program stored in a memory storage (for example, the memory storage 25 in FIG. 14A) and executes various processes according to the calibration program. The calibration program causes a computer to execute processes including: calculating a relative position between a first detector and a second detector on the basis of detection signals acquired respectively from the first detector, the second detector, and a third detector positioned with respect to a scale attached to a rotating body; and calculating error information on rotational position information of the rotating body on the basis of the calculated relative position as well as the detection signals. The calibration program may be recorded and provided in a computer-readable storage medium (for example, a non-transitory tangible medium).

The technical scope of the present invention is not limited to the modes described in the above embodiments and so forth. One or more of the requirements described in the above embodiments and so forth may be omitted. One or more of the requirements described in the above embodiments and so forth may also be combined where appropriate. Furthermore, the contents of all documents cited in the detailed description of the present invention are incorporated herein by reference to the extent permitted by law.

DESCRIPTION OF REFERENCE SIGNS

1: Calibrator
2: Detector
4: Memory storage
5: Corrector
S: Scale
11: First detector
12: Second detector
13: Third detector
15: Position calculator
16: Error calculator
EC: Encoder EC2: Encoder
MTR: Driving device
RBT: Robot
SF1: Rotating body
SF2: Rotating body
STG: Stage device

The invention claimed is:

1. An encoder comprising:
a scale attached to a rotation shaft;
a first detector which detects the scale and outputs a first detection signal;
a memory which stores error information calculated using a relative position between the first detector and at least one of two detectors, the two detectors being different from the first detector, the relative position being calculated based on the first detection signal as well as a second detection signal and a third detection signal which are output by the two detectors upon detecting the scale, the first detector and each of the two detectors that are different from the first detector outputting the first, second and third detection signals by reading a same pattern on the scale; and
a corrector which corrects rotational position information of the rotation shaft acquired from the first detection signal, using the error information,
wherein the first detector and each of the two detectors that are different from the first detector face the scale, and the scale includes an incremental pattern and absolute pattern that are reflective or transmissive.

2. The encoder according to claim 1, further comprising a processor which calculates the rotational position information based on the first detection signal.

3. The encoder according to claim 1, further comprising a position calculator which calculates, as the relative position, an angle between the first detector and one of the two detectors about a rotation axis as viewed in a direction of the rotation axis of the rotation shaft.

4. The encoder according to claim 3,
wherein the position calculator calculates the relative position based on a difference between the first detection signal and the second detection signal and a difference between the first detection signal and the third detection signal.

5. The encoder according to claim 3,
wherein the position calculator calculates the relative position based on an amplitude and a phase of a difference between the first detection signal and the second detection signal, and an amplitude and a phase of a difference between the first detection signal and the third detection signal.

6. An encoder which calculates rotational position information of a rotation shaft, the encoder comprising:
a scale attached to the rotation shaft;
a calibration target detector fixed on a substrate and which detects the scale and outputs a first detection signal;
a processor which calculates the rotational position information based on the first detection signal; and
a corrector which corrects the rotational position information, using error information stored in a memory,
wherein the error information is calculated based on a relative position between the calibration target detector and at least one of the two calibration detectors that are attached to the substrate when calculating the error information, the relative position being calculated using the first detection signal as well as a second detection signal and a third detection signal output by the two calibration-target detectors upon detecting the scale, the calibration target detector and each of the two calibration detectors outputting the first, second and third detection signals by reading a same pattern on the scale,
wherein the calibration target detector and each of the two calibration detectors face the scale, and the scale includes an incremental pattern and an absolute pattern that are reflective or transmissive.

7. The encoder according to claim 6,
wherein the processor calculates the rotational position information using the first detection signal, in a state where the two calibration detectors are removed from the substrate.

8. The encoder according to claim 6, further comprising a position calculator which calculates, as the relative position, an angle between the calibration target detector and one of the two calibration detectors about a rotation axis as viewed in a direction of the rotation axis of the rotation shaft.

9. The encoder according to claim 8,
wherein the position calculator calculates the relative position based on a difference between the first detection signal and the second detection signal and a difference between the first detection signal and the third detection signal.

10. A calibrator comprising:
a position calculator which calculates a relative position between a first detector and a second detector based on detection signals acquired respectively from the first detector, the second detector, and a third detector positioned with respect to a scale attached to a rotating body, the first detector, the second detector and the third detector outputting the detection signals by reading a same pattern on the scale; and
an error calculator which calculates error information on rotational position information of the rotating body based on the basis of the relative position calculated by the position calculator and the detection signals,
wherein the first detector, the second detector and the third detector face the scale, and the scale includes an incremental pattern and an absolute pattern that are reflective and transmissive.

11. The calibrator according to claim 10,
wherein the position calculator calculates, as the relative position, an angle between the first detector and the second detector about a rotation axis of the rotating body as viewed in a direction of the rotation axis of the rotating body.

12. The calibrator according to claim 10,
wherein the position calculator calculates the relative position based on a difference between a first detection signal acquired from the first detector and a second detection signal acquired from the second detector and a difference between the first detection signal and a third detection signal acquired from the third detector.

13. The calibrator according to claim 12,
wherein the position calculator calculates the relative position based on the difference between the first detection signal and the second detection signal, and an amplitude and a phase of the difference between the first detection signal and the third detection signal.

14. The calibrator according to claim 10,
wherein the error calculator calculates, as the error information, first error information on the first detection signal acquired from the first detector, using the relative position calculated by the position calculator.

15. The calibrator according to claim 14,
wherein the position calculator calculates a second relative position between the first detector and the third detector, and
the error calculator calculates, as the error information, second error information on the first detection signal acquired from the first detector, using the second relative position calculated by the position calculator.

16. The calibrator according to claim 15,
wherein the position calculator calculates the second relative position based on a difference between a first detection signal acquired from the first detector and a second detection signal acquired from the second detector and a difference between the first detection signal and a third detection signal acquired from the third detector.

17. The calibrator according to claim 15,
wherein the error calculator calculates the error information based on the first error information and the second error information.

18. The calibrator according to claim 17,
wherein the error calculator calculates the error information by averaging the first error information and the second error information.

19. The calibrator according to claim 10,
wherein the error calculator calculates the error information based on an amplitude of a difference between a first detection signal acquired from the first detector and a second detection signal acquired from the second detector and an amplitude of a difference between the first detection signal and a third detection signal acquired from the third detector.

20. The calibrator according to claim 10,
wherein the error calculator calculates, as the error information, a correction amount for the rotational position information of the rotating body.

21. The calibrator according to claim 10,
wherein the first detector includes a plurality of detection units, and
one or both of the position calculator and the error calculator use, as a detection signal of the first detector, an averaged signal of signals acquired from the plurality of detection units.

22. The calibrator according to claim 10,
wherein the error calculator calculates an error of an i-th order component of the Fourier series representing a detection result of the first detector, where i is an integer greater than or equal to 2; and
one or both of an angle between the first detector and the second detector in a rotation direction of the rotating body and an angle between the first detector and the third detector in the rotation direction of the rotating body are set to an angle other than $2\pi/j \times i$ [rad], where j is an integer greater than or equal to 2.

23. The calibrator according to claim 10, further comprising
a detection system which includes the first detector, the second detector, and the third detector,
wherein at least one of the first detector, the second detector, and the third detector can be removed from the detection system.

24. A driving device comprising:
the encoder according to claim 1; and
a driver which supplies a driving force to the rotation shaft.

25. A stage device comprising:
the driving device according to claim 24; and
a stage which is moved by the driving device.

26. A robot comprising:
the driving device according to claim 24; and
an arm which is moved by the driving device.

27. An encoder manufacturing method comprising:
calculating a relative position between a first detector and a second detector based on detection signals acquired respectively from the first detector, the second detector, and a third detector positioned with respect to a scale attached to a rotating body, the first detector, the second detector and the third detector outputting the detection signals by reading a same pattern on the scale;
calculating error information on rotational position information of the rotating body based on the calculated relative position and the detection signals; and
storing the error information in a memory of an encoder,
wherein the first detector, the second detector and the third detector face the scale, and the scale includes an incremental pattern and an absolute pattern that are reflective and transmissive.

28. The encoder manufacturing method according to claim 27,
wherein the relative position includes an angular position which is an angle between the first detector and the second detector as viewed in a direction of a rotation axis of the rotating body.

29. The encoder manufacturing method according to claim 27, further comprising
removing at least one of the first detector, the second detector, and the third detector from the encoder after the error information has been calculated.

30. The encoder manufacturing method according to claim 27, further comprising:
removing the first detector, the second detector, and the third detector from the encoder after the error information has been calculated; and
attaching the calibration target detector to the encoder so as to be positioned with respect to the scale.

31. The encoder manufacturing method according to claim 27, further comprising:
calculating a second relative position between the first detector and the third detector, and
calculating second error information as the error information, using the second relative position.

32. A non-transitory computer-readable storage medium storing a calibration program causing a computer to execute processes comprising:
calculating a relative position between a first detector and a second detector based on detection signals acquired respectively from the first detector, the second detector, and a third detector positioned with respect to a scale attached to a rotating body, the first detector, the second detector and the third detector outputting the detection signals by reading a same pattern on the scale; and
calculating error information on rotational position information of the rotating body based on the calculated relative position and the detection signals,
wherein the first detector, the second detector and the third detector face the scale, and the scale includes an incremental pattern and an absolute pattern that are reflective and transmissive.

33. The encoder according to claim 3, further comprising
an error calculator which calculates the error information using a first error information and a second error information, wherein
the two detectors are a second detector and a third detector, and
the position calculator
- calculates a first differential waveform related to the second detector based on the first and second detection signals,
- calculates a second differential waveform related to the third detector based on the first and third detection signals,
- calculates a first relative position between the first detector and the second detector based on the first differential waveform and the second differential waveform,
- calculates a second relative position between the first detector and the third detector based on the first differential waveform and the second differential waveform,
- calculates a first error information based on the first relative position, the first differential waveform and the second differential waveform,
- calculates a second error information based on the second relative position, the first differential waveform and the second differential waveform, and
- calculates the error information based on the first error information and the second error information.

\* \* \* \* \*